US008255888B2

(12) United States Patent
Jesse et al.

(10) Patent No.: US 8,255,888 B2
(45) Date of Patent: Aug. 28, 2012

(54) API DERIVATION AND XML SCHEMA DERIVATION FOR DEVELOPING APPLICATIONS

(75) Inventors: Stefan Jesse, Muehlhausen (DE); Johannes Lauterbach, Heidelberg (DE)

(73) Assignee: SAP AG, Walldorf (DE)

( * ) Notice: Subject to any disclaimer, the term of this patent is extended or adjusted under 35 U.S.C. 154(b) by 876 days.

(21) Appl. No.: 10/676,373

(22) Filed: Sep. 30, 2003

(65) Prior Publication Data

US 2005/0071801 A1 Mar. 31, 2005

(51) Int. Cl.
*G06F 9/45* (2006.01)
(52) U.S. Cl. ...................................... 717/143
(58) Field of Classification Search .................. 717/104, 717/106, 107–118, 143; 715/513.517, 500, 715/763, 513, 517; 709/223, 202, 315; 719/310, 719/313, 315, 319, 328; 705/1, 37; 707/10, 707/103 R
See application file for complete search history.

(56) References Cited

U.S. PATENT DOCUMENTS

| | | | |
|---|---|---|---|
| 5,872,973 A | 2/1999 | Mitchell et al. | |
| 6,041,180 A | 3/2000 | Perks et al. | |
| 6,467,085 B2 | 10/2002 | Larsson | |
| 6,557,165 B1 | 4/2003 | Nagashima et al. | |
| 6,581,062 B1 | 6/2003 | Draper et al. | |
| 6,658,644 B1 | 12/2003 | Bishop et al. | |
| 6,691,298 B1 | 2/2004 | Russo et al. | |
| 6,804,682 B1 | 10/2004 | Kemper et al. | |
| 6,851,106 B1 | 2/2005 | Narisawa et al. | |
| 6,877,154 B2 | 4/2005 | Nagashima et al. | |
| 6,920,461 B2 * | 7/2005 | Hejlsberg et al. | 707/103 R |
| 6,934,712 B2 | 8/2005 | Kiernan et al. | |
| 6,947,945 B1 | 9/2005 | Carey et al. | |
| 6,964,053 B2 * | 11/2005 | Ho et al. | 719/319 |
| 6,968,343 B2 | 11/2005 | Charisius et al. | |
| 6,968,438 B1 | 11/2005 | Russo et al. | |
| 6,973,626 B1 | 12/2005 | Lahti et al. | |
| 7,000,219 B2 * | 2/2006 | Barrett et al. | 717/107 |
| 7,043,481 B2 * | 5/2006 | Mullins et al. | 707/10 |
| 7,043,714 B2 | 5/2006 | Lin et al. | |
| 7,051,316 B2 | 5/2006 | Charisius et al. | |
| 7,058,886 B1 * | 6/2006 | Sulistio et al. | 715/517 |
| 7,076,762 B2 | 7/2006 | Fisher | |
| 7,076,764 B2 | 7/2006 | Kramer | |
| 7,076,766 B2 * | 7/2006 | Wirts et al. | 717/121 |
| 7,086,065 B1 * | 8/2006 | Yeluripati et al. | 719/311 |
| 7,096,224 B2 | 8/2006 | Murthy et al. | |
| 7,114,149 B2 * | 9/2006 | Aptus et al. | 717/123 |
| 7,124,144 B2 | 10/2006 | Christianson et al. | |
| 7,152,229 B2 | 12/2006 | Chong et al. | |

(Continued)

OTHER PUBLICATIONS

Abrams, Mark, et al., "UIML: An XML Language for Building Device—Independent User Interfaces," Dec. 1999 [online], [retrieved on May 17, 2004]. Retrieved from the Internet: < URL: http://www.harmonia.com/resources/papers/xml99Final.pdf>, XP002280477, 15 pgs.

(Continued)

*Primary Examiner* — Tuan Anh Vu
(74) *Attorney, Agent, or Firm* — Finnegan, Henderson, Farabow, Garrett & Dunner LLP

(57) ABSTRACT

Methods and apparatus, including computer program products, for developing an application. The development includes the use of a data model (e.g., a metamodel represented using UML) from which an API is derived. The API can include features derived from customizable extensions within the data model.

16 Claims, 17 Drawing Sheets

U.S. PATENT DOCUMENTS

| | | | |
|---|---|---|---|
| 7,181,456 B2 | 2/2007 | Huang | |
| 7,210,097 B1* | 4/2007 | Clarke et al. | 715/227 |
| 7,426,521 B2* | 9/2008 | Harter | 707/103 R |
| 2002/0108101 A1* | 8/2002 | Charisius et al. | 717/105 |
| 2002/0184401 A1* | 12/2002 | Kadel et al. | 709/315 |
| 2003/0149934 A1* | 8/2003 | Worden | 715/513 |
| 2003/0163603 A1* | 8/2003 | Fry et al. | 709/328 |
| 2003/0196168 A1* | 10/2003 | Hu | 715/513 |
| 2003/0208505 A1* | 11/2003 | Mullins et al. | 707/102 |
| 2004/0015834 A1* | 1/2004 | Mestre et al. | 717/106 |
| 2005/0005261 A1* | 1/2005 | Severin | 717/108 |
| 2005/0044197 A1* | 2/2005 | Lai | 709/223 |

OTHER PUBLICATIONS

Abrams, Marc, et al., "User Interface Markup Language (UIML) Specification, Version 3.0," Feb. 8, 2002 [online], [retrieved on May 18, 2002]. Retrieved from the Internet: < URL: http://www.uiml.org/specs/docs/uiml130-revised02-12-02.pdf>, XP002280679, 116 pgs.

Ali, Mir Farooq, et al., "Building Multi-Platform User Interfaces with UIML," Nov. 9, 2001 [online], [retrieved on May 17, 2004]. Retrieved from the Internet: < URL: http://arxiv.org/ftp/cs/papers/0111/0111024.pdf>, XP002280476, XP002280477, XP002280490, 12 pgs.

Cagle, Kurt, et al., "Professional XSL," 2001, Wrox Press Ltd., Arden House, Birmingham, UK, XP002281359, p. 742.

Levine, John R., "Linkers & Loaders," 2000, Morgan Kaufmann Publishers, San Francisco, CA, XP002283283, p. 48.

Phanouriou, Constantinos, "UIML: A Device-Independent User Interface Markup Language," Virginia Polytechnic Institute and State University, Sep. 26, 2000 [online], [retrieved on May 17, 2004]. Retrieved from the Internet: < URL: http://scholar.lib.vt.edu/theses/available/etd-08122000-19510051/unrestricted/PhanouriouETD.pdf>,XP002280491, 172 pgs.

Phanouriou, Constantinos, "User Interface Markup Language (UIML) Draft Specification, Version 2.0a," Jan. 17, 2000 [online], [retrieved on May 17, 2004]. Retrieved from the Internet: < URL: http://www.uiml.org/specs/docs/uiml120-17Jan00.pdf>, XP002280490, 64 pgs.

"Computer Science, abstract," Arxvix.org E-Print Archive, retreived from the Internet on May 17, 2004, at http://arxiv.org/abs/cs.HC/0111024, XP002280478.

"A Mapping Schema and Interface for the XML Stores", Sihem Amer-Yahia et ai, ACM, pp. 23-30, Nov. 2002.

"UML and XML Schema", Nicholas Routledge et ai, ACM, pp. 157-166, Jan. 2002.

Template Software SNAP Foundation Template Using the SNAP Development Environment (SNAP), copyright 1998, released 1997.

Template Software SNAP Foundation Template Using the SNAP Permanent Storage Component (PERM), copyright 1998, released 1997.

Template Software SNAP Foundation Template Using the SNAP Communication Component (COM), copyright 1998, released 1997.

Template Software Web Component, Using the WEB Component (WEB), copyright 1997, released 1997.

Template Software Foundation Template SNAP Application Developer's Training Course, (TRAINS) Module 1 and 10,1997.

Template Workflow Template Process Foundation, Using the WFT Development Environment (ENV), copyright 1998.

Template Workflow Template Process Foundation, Developing a WFT System (WFT), copyright 1998.

Workflow Template Training Course Version 8.0, Section A, 1997.

SNAP Foundation Template, Using the SNAP Language, Template Software, Version 8.0, 1997,. Appendix A.

SNAP Foundation Template, Getting Started With SNAP, Template Software, Version 8.0, 1998.

Refactoring, Martin Fowler, ACM, 2002, p. 701.

Cascaded Refactoring for Framework Evolution, Greg Butler et ai, ACM, 2001, pp. 51-57.

Automatic Inheritance Hierarchy Restructuring and Method Refactoring, Ivan Moore, ACM, 1996, pp. 235-250.

Automated Refactoring to Introduce Design Patterns, Mel 0 Cinneide, ACM, 2000, pp. 722-724.

* cited by examiner

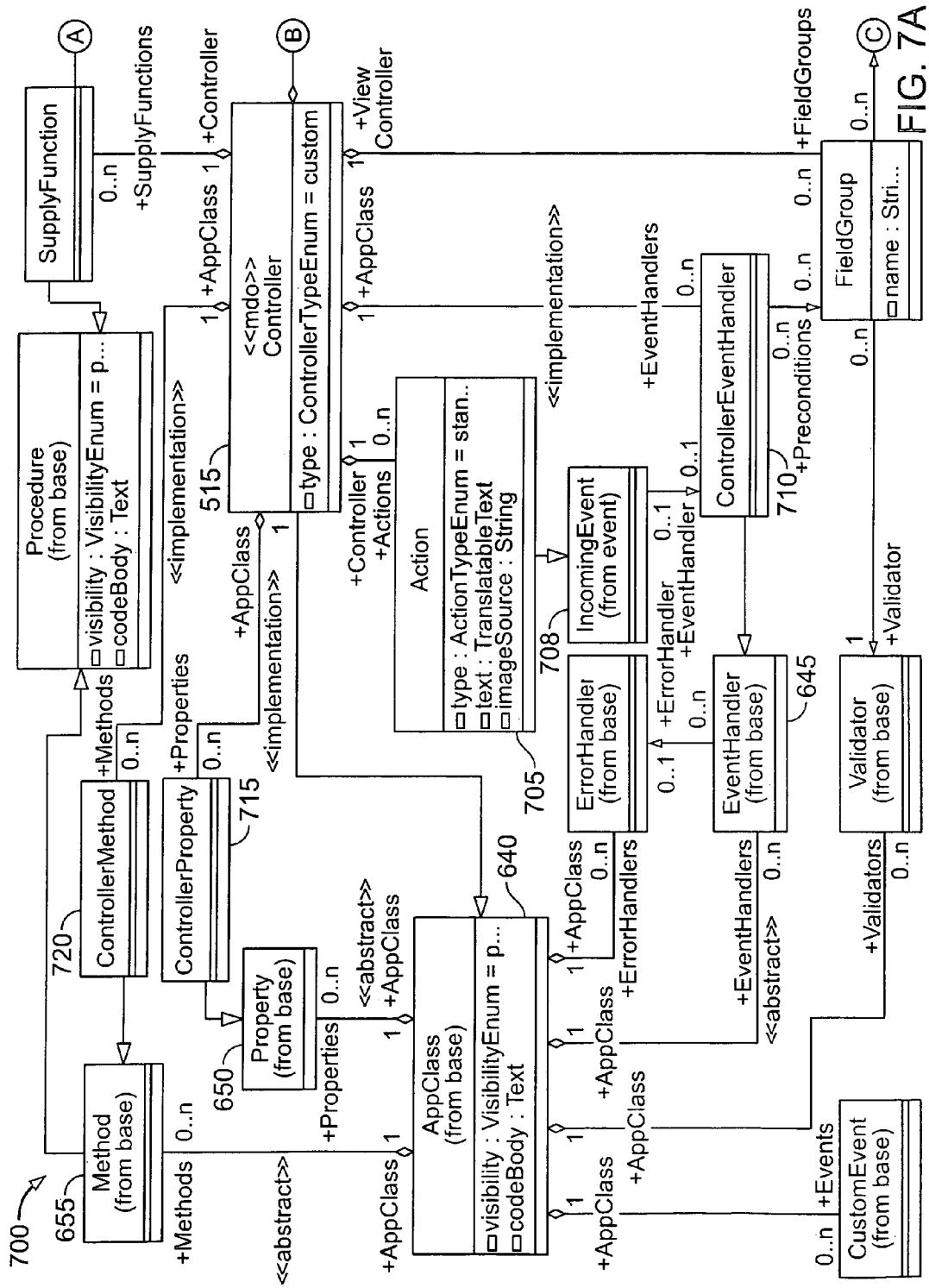

_US 8,255,888 B2_

API DERIVATION AND XML SCHEMA DERIVATION FOR DEVELOPING APPLICATIONS

BACKGROUND

The present invention relates to data processing by a computing device, and more particularly to developing applications.

A user interface (UI) facilitates the interaction between humans and computers by inviting and responding to user input. User interfaces come in many varieties, and are designed to work in concert with application programs. A common scenario involving user interfaces is a network application, where a network connects an application program running on a server and one or more user interfaces running on client devices. The client/server relationship is one in which a server provides services to the client devices. Both the client devices and the server typically have a network interface for accessing networks such as a local area network (LAN), a wide area network (WAN), or the Internet.

In a network environment, a common client device is a personal computer, and a common client program is a Web browser. The client program, which displays a user interface for an application running on a server, enables networked communication between the client device and the server using a data transfer protocol, e.g., the Hypertext Transfer Protocol (HTTP), to exchange files, images, programs, or application data. HTTP is a request/response-type protocol that specifies how the client device and the server communicate with each other. The server may receive a request from the client device using HTTP, respond to the request, and then close the connection. HTTP is a stateless protocol, meaning that each time a client device requests a Web page, the server will respond to the request independently of any previous requests by the client device, and without recording the request.

The information transmitted from the server and intended for display in the client program on the client device may be marked up with Hypertext Markup Language (HTML) code or Extensible Markup Language (XML) code. HTML is a language that is used to describe the structure of a document, such as a Web page. Client programs interpret HTML code to determine how to display the information contained in the page. A user may request a Web page from a server by clicking on a hyperlink or specifying a Uniform Resource Locator (URL) string. A URL can be used to identify the address of a file or Web page that may be accessed on a network. The address identifies the Web server on which the file is stored and the directory in which the file is located. When the server receiving the URL request finds the sought Web page, the server sends the page to the client device so that the client device can use that Web page, for example, by generating a display for a user according to the Web page.

SUMMARY OF THE INVENTION

The description describes methods and apparatus, including computer program products, for using a metamodel as the basis for development of applications. These applications include, for example, a user interface portion that is distributed over a network, such as the Internet.

In general, in one aspect, there is a computer program product, tangibly embodied in an information carrier, for developing applications. The computer program product is operable to cause data processing apparatus to interact with data conforming to a data model. The data model includes a component class and a model class associated with the component class. The model class includes a model-class class and a model relation class, and the model-class class includes a model class attribute class, and the model relation class includes a model relation role class. The data model also includes a controller class associated with the component class. The controller class includes a context node class having a context attribute class. The context node class is associated with the model-class class and the model relation class. The context attribute class is associated with the model class attribute class. The data model also includes a view class associated with the component class. The view class includes a user interface element class having a binding with either the context node class or the context attribute class.

In other examples, the computer program product has one or more of the following features. The data model can also include a context element class that is a superclass of the context node class and the context attribute class. The binding can be associated with one of the context node class and the context attribute class using the context element class. The association between the component class and the view class can be an aggregation. The association between the component and the controller can be an aggregation. The data model can include an indicator that is used to determine a file border. The data model can include an indicator used to implement a platform-specific feature. The data model can include an indicator representing translatable text. At least one of the associations in the data model can be an aggregation, and the data model can include an indicator representing whether the aggregation is ordered. The data model can include an indicator representing a singular name. The data model can include an indicator representing whether an attribute is nullable. The data model can include an unassociated class defining enumeration attributes representing allowed values of a specific enumeration type.

In another aspect, there is computer program product, tangibly embodied in an information carrier, for developing applications. The computer program product is operable to cause data processing apparatus to generate an instance of a model. The instance of the model includes a model class instance and a model relation instance. The model class instance includes a model class attribute instance and the model relation instance includes a model relation role instance. The computer program product also causes data processing apparatus to generate an instance of a controller. The instance of the controller includes a context node instance having a context attribute instance. The computer program product also causes data processing apparatus to generate an instance of a view. The instance of the view includes a user interface element instance. The context node instance is associated with the model class instance. The context node instance is associated with the model relation instance. The context attribute instance is associated with the model class attribute instance. The user interface element instance is associated with one of the context node instance and the context attribute instance. The association between the controller instance and the context node instance can be an aggregation. The association between the model instance and the model class instance can be an aggregation.

In another aspect, there is a system for developing applications. The system includes a repository including data conforming to a data model. The data model includes a component class and a model class associated with the component class. The model class includes a model-class class and a model relation class. The model-class class includes a model class attribute class and the model relation class includes a model relation role class. The data model also includes a controller class associated with the component class. The controller class includes a context node class having a context attribute class. The context node class is associated with the model-class class and the model relation class. The context attribute class is associated with the model class attribute class. The data model also includes a view class associated with the component class. The view class includes a user interface element class having a binding with either the context node class or the context attribute class.

In other examples, the system has one or more of the following features. The data model can also include an indicator that is used to determine a file border. The data model can also include an indicator that is used to implement a platform-specific feature. The data model can also include an indicator representing translatable text. At least one of the associations in the data model can be an aggregation, and the data model can include an indicator representing whether the aggregation is ordered. The data model can also include an indicator representing a singular name. The data model can also include an indicator representing whether an attribute is nullable.

In another aspect, there is a computer program product, tangibly embodied in an information carrier, for developing an application. The computer program product is operable to cause data processing apparatus to receive a first data model in a first language, where the data model is used to implement development objects. The computer program product also causes data processing apparatus to generate a set of intermediate objects based on the first data model and, based on the set of intermediate objects and a code template, generate an API to access the development objects.

In other examples, the computer program product has one or more of the following features. The computer program product can include instructions to convert the first data model to a second data model in a second language, wherein the set of intermediate objects is based on the second data model. The second language can include XML. The first language can include UML. The set of intermediate objects can include Java objects. The first language can include a customizable extension. The customizable extension can be used to implement an additional feature of the API. The additional feature can include an indication of a file border. The API can also include a copy and paste operation.

In another aspect, there is a computer program product, tangibly embodied in an information carrier, for developing an application. The computer program product is operable to cause data processing apparatus to receive a first data model in a first language, where the data model being used to implement development objects. The computer program product also causes data processing apparatus to generate a set of intermediate objects based on the first data model and, based on the set of intermediate objects and a schema template, generate an XML schema used to implement the development objects.

In other examples, the computer program product has one or more of the following features. The computer program product can include instructions to convert the first data model to a second data model in a second language, wherein the set of intermediate objects is based on the second data model. The second language can include XML. The first language can include UML. The set of intermediate objects can include Java objects. The XML schema can include a tree based on aggregation relationships in the first data model. The XML schema can include a reference based on an association relationship in the first data model. The XML schema can include a complex type extension based on an inheritance relationship in the first data model.

In another aspect, there is a computer program product, tangibly embodied in an information carrier, for developing an application, the computer program product being operable to cause data processing apparatus to receive a first data model, derive an API based on the data model, and use the API to perform operations on a development object. In other examples, the computer program product has one or more of the following features. The API can include an interface layer, a proxy layer, and a state layer. The operations can include creating a new development object without an existing corresponding file as a transient object, and modifying the transient object until the transient object is committed to a persistent file. The computer program product can include instructions to destroy the transient object if a delete is requested before the transient object is committed to a persistent file. The computer program product can include instructions to mark the persistent file as deleted if a delete is requested after the transient object is committed to a persistent file.

In another aspect, there is a method for developing an application. The method includes defining file borders for development objects in a data model and storing the development objects of the application in a file-based repository based on the file borders. The method also includes employing an API derived from the data model to access the development objects.

In other examples, the method has one or more of the following features. The method can include caching the development objects in a local cache. The method can include identifying one of the development objects as a main development object to be included in a file with any development objects that are defined in the data model to be children objects of the main development object that are not identified as main development objects. The method can include storing in the file user-defined code associated with the main development object. The method can include storing in the file a reference to another development object stored in another file. The method can include enabling a user to define a source path for one of the development objects.

The method can include using tools that use the API to enable a user to perform development operations. One of the development operations can include a copy and paste operation. The method can include enabling a user to refactor a copied development object. The method can include enabling a user to define a scope of the refactor. The method can include storing translatable text separate from the development objects.

In another aspect, there is a method for developing applications. The method includes generating a data model for an application, where the data model is implemented in a language that includes a customizable extension and the data model includes a feature defined using the customizable extension. The method also includes deriving an API from the data model, where the API incorporates the feature, and enforcing constraints specified in the data model by employing the derived API during development of the application.

In other examples, the method has one or more of the following features. The feature can include an indication used to implement a file border. The feature can include an indication used to implement a platform-specific feature. The feature can include an indication representing translatable text. The feature can include an indication representing that an aggregation in the data model is ordered. The feature can include an indication representing a singular name. The feature can include an indication representing that an attribute in the data model is nullable.

In another aspect, there is a system for developing an application. The system includes a repository storing development objects using file borders defined in a data model. The system also includes a local development cache for caching the development objects from the repository. The system also includes an API derived from the data model and a user interface development tool that uses the API to access the development objects.

In other examples, the system has one or more of the following features. The system can include a repository server that includes the repository. The interface development tool comprises one of a project browser, an application modeler, a view designer, a controller and context editor, and a model editor.

Implementations can realize one or more of the following advantages. The use of a metamodel to define all of the elements of applications including a user interface portion ensures consistency between such applications, and compatibility with the development and runtime environments used to design and execute the applications. Application development can be simplified through the generation and use of tools that let developers create and interrelate application elements according to the metamodel. Deriving an application program interface (API) from the metamodel ensures that the API enforces the definitions of the metamodel. Extending the metamodel standards enables a derived API to provide features beyond a simple persistency layer. The metamodel also allows deriving dependencies between objects used in the development process. One implementation of the invention provides all of the above advantages.

The details of one or more examples are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
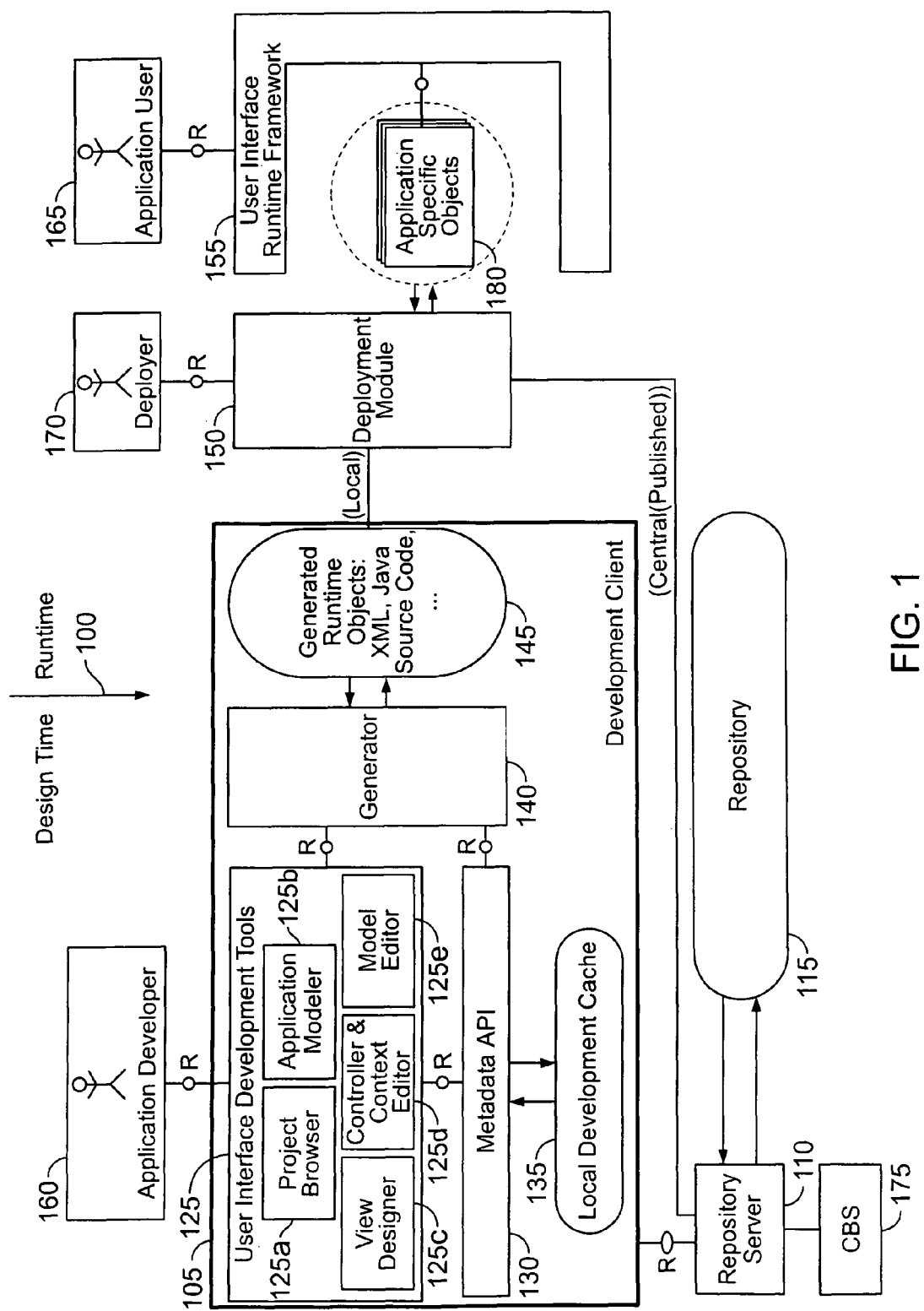
FIG. 1 is a block diagram of a system to allow a user to develop, deploy, and execute applications.

FIG. 1 illustrates a system 100 that can be used to develop, deploy, and execute applications that include a user interface (UI) portion. To accomplish these tasks, the system 100 includes both design time and runtime elements. System 100 includes a development client 105, which communicates with a repository server 110 that serves as an interface for a repository 115. Development client 105 includes user interface development tools 125, a metadata application program interface (API) 130, a local development cache 135, a generator 140, and a cache 145 for generated runtime objects. As illustrated in FIG. 1, user interface development tools 125 can include a project browser 125*a*, an application modeler 125*b*, a view designer 125*c*, a controller and context editor 125*d*, and a model editor 125*e*. System 100 also includes a deployment module 150 and a user interface runtime framework 155.

In operation, an application developer 160 uses development client 105 to develop, for example, a Web user interface application. Application developer 160 uses the applicable user interface development tools 125 to create and modify elements of the user interface application. An advantage of system 100 is that application developer 160 does not need to generate source code to develop the application. Instead, application developer 160 develops the application using a highly declarative programming model that uses metadata to define the elements of the application. In such an example, instead of dealing with program code, application developer 160 creates development objects and defines relations between these development objects. Development objects represent the declarative building blocks development client 105 manages. Development object content is also called metadata. In other words, application developer 160 "composes" development objects in a declarative way, using metadata, rather than writing "code" to generate a user interface application. As explained in more detail below, system 100 uses a metamodel to define the development objects and a metadata API 130. Some example development objects for a user interface application include UI elements (e.g., screen controls such as buttons and input fields), views (e.g., displays with layouts of UI elements), data bindings (e.g., bindings between UI elements and application data), inbound and outbound plugs as start- and end-points for navigational links between the views, and the like.

System 100 stores the development objects in repository 110. In one implementation, system 100 stores the development objects as platform-independent descriptions (for example, XML files). To generate and modify development objects, user interface development tools 125 interact with a metadata API 130. In the illustrated example, metadata API 130 uses local development cache 135 to store those development objects with which user interface development tools 125 are currently interacting. After the development objects have been created, generator 140 uses those objects to generate runtime objects (e.g., classes and source code) that can be deployed for use by an application user 165. In other words, because the development objects are a declarative representation, development client 105 transforms those development objects into source code that system 100 can compile to execute the application. Generator 140 can generate the runtime objects using specific languages such as, for example, Java, XML, and/or other platform-neutral or platform-specific source code. As illustrated, system 100 stores the generated runtime objects in cache 145. Local development cache 135 and runtime cache 145 can be the same physical device with, for example, different directories for development objects and runtime objects.

After the runtime objects have been generated, a deployer 170 uses deployment module 150 to deploy the generated runtime objects to an application server. Deployment module 150 can deploy local objects from cache 145, for example, if application developer 160 wants to evaluate created and/or modified objects in a runtime environment. Deployment module 150 can also deploy runtime objects from a central storage module, such as repository 110, where the runtime objects have been published (e.g., indicated ready for deployment). To publish objects, system 100 can use a component build server (CBS) 175 that performs verification operations to ensure that the objects will properly execute in a runtime environment. Once deployed to a server, the application specific objects 180 interact with the runtime framework 155 to generate a user interface that application user 165 uses to interact with the application. As explained previously, in a network scenario, the generated user interface is displayed to the application user 165 in a client program (e.g., a browser) on a client device. The runtime framework 155 can be used to provide services common to all applications (e.g., rendering of UI elements, selection of a suitable adapter to communicate with the client program, etc.).

Metamodel Relationship

Figure 2:
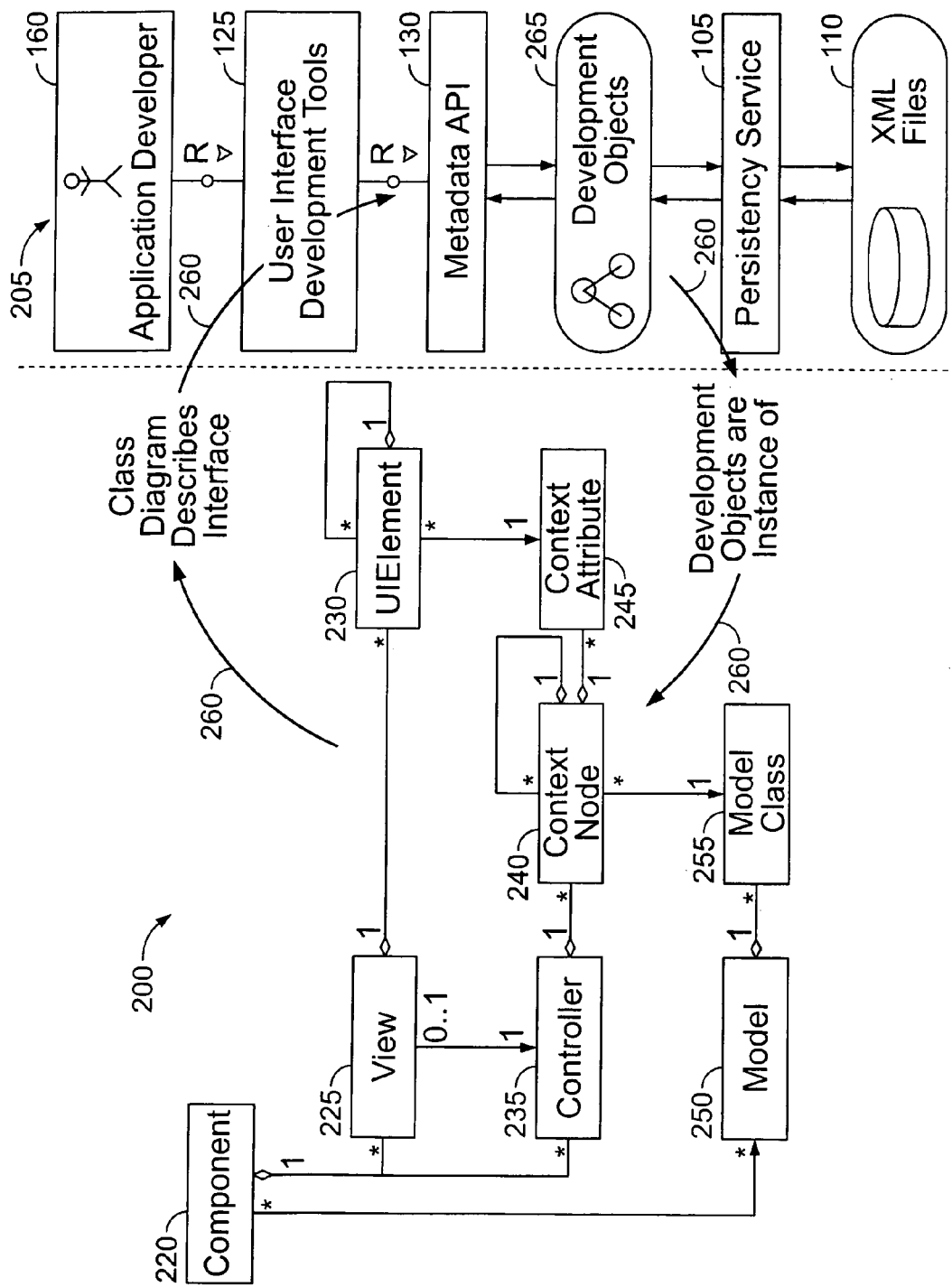
FIG. 2 is a block diagram of a metamodel and a portion of a development process.

As mentioned above, the development process in system 100 is based on a metamodel. FIG. 2 illustrates a metamodel 200 (e.g., a semantic information model), which is represented using a unified modeling language (UML) class diagram, in conjunction with a portion 205 of a development process for developing a user interface application 260. The specifications for UML, which are set forth by the Object Management Group (OMG), can be found on OMG's web site at http://www.omg.org/uml/.

As illustrated in FIG. 2, the classes of metamodel 200 can include application components 220, views 225 with UI elements 230, controllers 235 with context nodes 240 and context attributes 245, and models 250 with model classes 255. Components 220 represent reusable entities that can be used to group various application elements (e.g., models, views, controllers, and contexts). Context node 240, which is associated with controller 235, provides a storage area for the data used by the controller 235, as well as methods for storing and accessing the data based on a declared data structure. The metamodel 200 also can include relationships between the metamodel classes, as shown in FIG. 2. The UML class diagram of the metamodel 200 can be viewed, in essence, as a formal description of the programming model for a user interface application. An advantage of using UML to represent metamodel 200 is that the representation of the metamodel is platform-independent.

Arrows 260 represent relationships between the metamodel 200 and the portion 205 of the development process. FIG. 2 notes two relationships in particular, namely, one with an interface, and one with the instances of development objects 265. In both cases, the classes of metamodel 200 form a basis for the development process. In other words, metamodel 200 defines the constraints to which all user interface applications and the development of those applications have to conform.

The latter of the two relationships, represented by the bottom arrows 260, is that the development objects 265 that represent a user interface application (or portions thereof) are instances of the metamodel classes of metamodel 200. The former of the two relationships, represented by the top arrows 260, is that the class diagram representation of metamodel 200 describes the interface (e.g., the metadata API 130) used in the portion 205 of the development process. All clients (e.g., development tools 125) that need to create, modify, or otherwise access the development objects 265 do so via a common interface (e.g., the metadata API 130). As described in more detail below, the metadata API 130 can be derived from the metamodel 200. An advantage to this approach is that a derived interface exposes exactly those development object types that are defined by the metamodel used in the derivation process. In other words, API 130 enforces the restrictions defined by the metamodel. Metadata API 130 can also be used to obtain location information when application development tools 125 are marshalling development objects 265 to and from their persistent representation (e.g., an XML representation) in storage module 135 (e.g., local cache).

Metamodel Details

Figure 3:
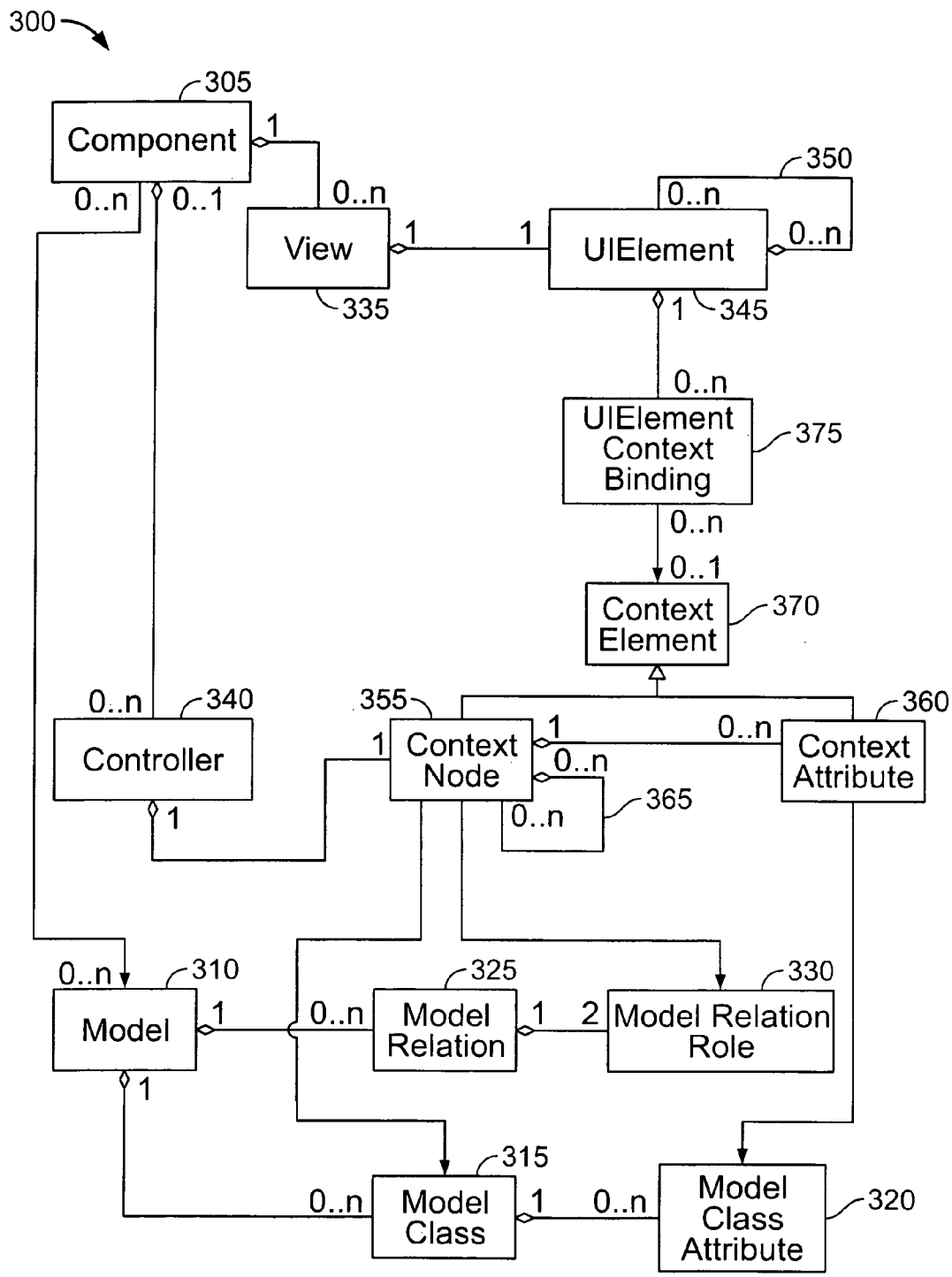
FIG. 3 is a block diagram of another metamodel.

FIG. 3 illustrates a UML class representation of another metamodel 300. The classes of metamodel 300 include a component 305, which is associated with a model 310. In UML, an association represents a semantic relationship between two classes that involves a connection between the instances of those classes. Model 310 includes an aggregation of zero or more model classes 315. In UML, an aggregation is a form of an association that represents a whole-part relationship between an aggregate (the whole) and the constituent part(s). The open diamond of an aggregation association is located at the aggregate class. Model class 315 includes an aggregation of zero or more model class attributes 320. Model 310 also includes an aggregation of zero or more model relations 325. Model relation 325 includes an aggregation of two instances of the class model relation role 330.

In addition to the association with model 310, component 305 includes an aggregation of zero or more views 335 and zero or more controllers 340. View 335 includes an aggregation of a User Interface (UI) element 345. As illustrated by relationship 350, UI element 345 can include an aggregation of other UI elements 345. Controller 340 includes an aggregation of a context node 355. Context node 355 includes an aggregation of zero or more context attributes 360. As illustrated by relationship 365, context node 355 also can include an aggregation of other context nodes 355. Context node 355 is associated with model class 315 and model relation role 330. Context attribute 360 is associated with model class attribute 320. Context element 370 is a general class from which either of the specialized classes context node 355 or context attribute 360 are derived. In UML, a generalization shows an inheritance relationship between objects. The hollow arrowhead points to the general class (e.g., superclass). UI element context binding 375 is associated with context element 370. In an implementation example, this represents that UI element context binding 375 can be associated with context node 355 or context attribute 360. UI element 345 also includes an aggregation of zero or more UI element context bindings 375.

As described above, each relationship has a multiplicity. Generally, the multiplicity (also referred to as cardinality) represents the number of instances at each end of an illustrated relationship. The multiplicities illustrated in metamodel 300 are "1", representing one instance, "2", representing two instances, "0 . . . 1", representing either zero or one instance, "0 . . . n", representing zero or more instances, and "1 . . . n", representing one or more instances. For example, the multiplicity between the association for component 305 and model 310 is zero or more (0 . . . n) instances of component 305 to zero or more (0 . . . n) instances of model 310. The multiplicity between the aggregation relationship for model relation 325 and model relation role 330 is two instances of model relation role 330 to one instance of model relation 325. This is because a model relation role 330 represents the endpoint of a model relation 325. In metamodel 300, this multiplicity shows that each model relation 325 has two endpoints (i.e., two model relation roles 330).

Figure 4:
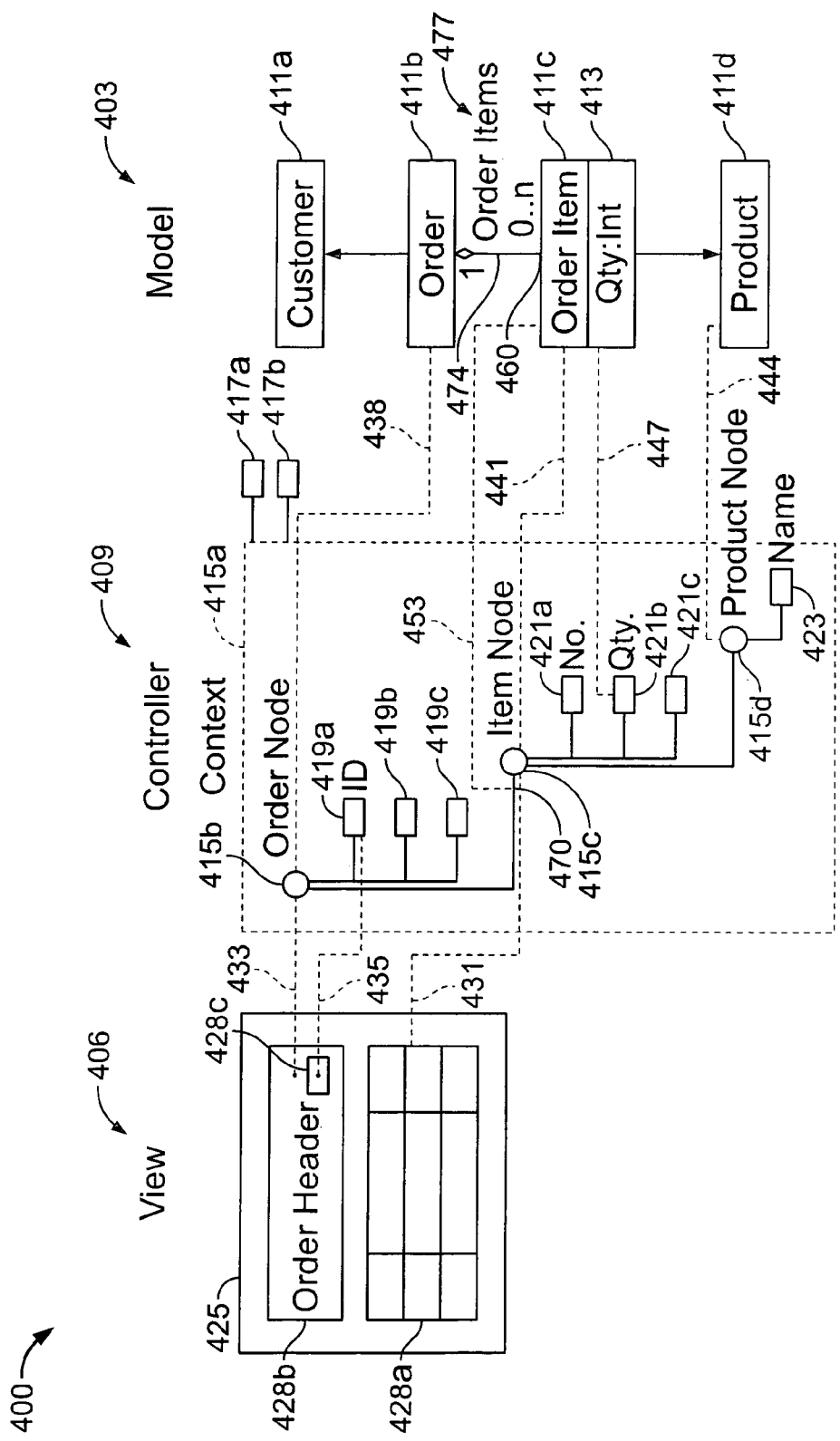
FIG. 4 is a block diagram of an example of a component instance.

To help show how metamodel 300 relates to a user interface application, FIG. 4 illustrates a simplified example of a component instance 400 (i.e., an instance of the component class 305) of a user interface application that includes instances of some of the other classes of metamodel 300. For clarity, the elements of component 400 and their associations are described first, and then the elements and associations are related back to metamodel 300. Component instance 400 is associated with instances of a model 403, a view 406, and a controller 409. Model 403 represents a model of the business application that this user interface application represents. View 406 represents a UI layout that the user interface application displays to a user. Controller 409 is the binding logic that associates UI view 406 to business application model 403. As illustrated, the simple example user interface application 400 represents an application to view and modify data associated with a customer order.

Model 403 includes model classes customer 411a, order 411b, order item 411c, and product 411d (generally model classes 411). Model classes 411 are illustrated in FIG. 4 using a UML representation. Model class 411c includes an attribute 413. Attribute 413 is labeled "Qty." and is an integer type. Controller 409 includes context nodes context 415a, order node 415b, item node 415c, and product node 415d (generally context nodes 415). Each context node 415 includes one or more context attributes. Context node 415a includes attributes 417a and 417b. Context node 415b includes attributes 419a (labeled "ID"), 419b, and 419c. Context node 415c includes attributes 421a (labeled "No."), 421b (labeled "Qty."), and 421c. Context node 415d includes attribute 423 (labeled "Name"). The attributes are generally referred to as attributes 417, 419, 421, and 423. View 406 includes a display layout 425 that includes UI elements 428a, 428b, and 428c (generally UI elements 428).

Component 400 includes associations 431, 433, and 435, which represent data bindings between view 406 and controller 409. As illustrated, the data bindings are between UI elements and context nodes or context attributes. Associations 431 and 433 are between UI elements 428a and 428b and context nodes 415c and 415b, respectively. Association 435 is between UI element 428c and context attribute 419a.

Component 400 also includes associations 438, 441, 444, 447, and 453, which represent data bindings between model 403 and controller 409. As illustrated, the data bindings are between model classes and context nodes, model relation roles and context node dependencies (e.g., parent-child relationship), or model class attributes and context attributes. Associations 438, 441, and 444 are between model classes 411b, 411c, and 411d and context nodes 415b, 415c, and 415d, respectively. Association 447 is between model class attribute 413 and context attribute 421b. Association 453 is between model relation role 460 and context node dependency 470. Model relation role 460 is one endpoint of aggregation relation 474 between order model class 411b and order item model class 411c. Model relation role 460 is named "order items" 477, to identify that model relation role 460 is the endpoint of relation 474 at order item model class 411c.

Relating this example back to metamodel 300 in FIG. 3, component instance 400 is an example instance of the component class 305 of the metamodel. Model 403 is an example instance of model class 310. Model classes 411 are example instances of model-class class 315. Attribute 413 is an example instance of model class attribute class 320. Relation 474 is an example instance of model relation class 325. Model relation role 460 is an example instance of model relation role class 330. Controller 409 is an example instance of controller class 340. Context nodes 415 are example instances of context node class 355. As illustrated in FIG. 3, the multiplicity of the aggregation between controller class 340 and context node class 355 is one instance of the former to one instance of the latter. The instance of controller 409 thus has a context node 415a (labeled "context") that serves as the root node of the context and the single instance of the context node aggregated to controller instance 409. The other context nodes 415b, 415c, and 415d are added under root context node 415a using aggregation relationship 365. Use of a single root node enables the developer of the user interface application to assign attributes (e.g., 417a and 417b) that are applicable to the entire context node tree, for example, Name and CustomerID of Customer whose orders are contained in the OrderNode.

Continuing with the example, attributes 417, 419, 421, and 423 are example instances of context attribute class 360. View 406 is an example instance of view class 335. UI elements 428 are example instances of UI element class 345. Associations 431, 433, and 435 are examples of the association between UI Element context binding class 375 and context element class 370. Metamodel 300 uses a context binding class 375 to bind elements of view 406 to elements of controller 409 because a single view element can be bound to multiple context elements (e.g., context nodes and/or context attributes), since view elements can have multiple bindable properties. Such a class is not used for binding elements of controller 409 to elements of model 403 because a single context element (e.g., context node and/or context attribute) is bound to a single element of model 403 (e.g., model class 411 or model attribute 413) because context elements have a single bindable property. Associations 438, 441, and 444 are examples of the association between context node class 355 and model-class class 315. Association 447 is an example of the association between context attribute class 360 and model-class class attribute 320. Association 453 is an example of the association between context node class 355 and model relation role class 330, defining the dependencies between instances of context nodes. Use of a model relation role (e.g., endpoint) to define dependencies between context nodes is advantageous because in a situation where either side of the model relation can be used (e.g., bidirectional relations), use of the relation role provides a directed relation to ensure the proper direction is followed.

Figure 5A:
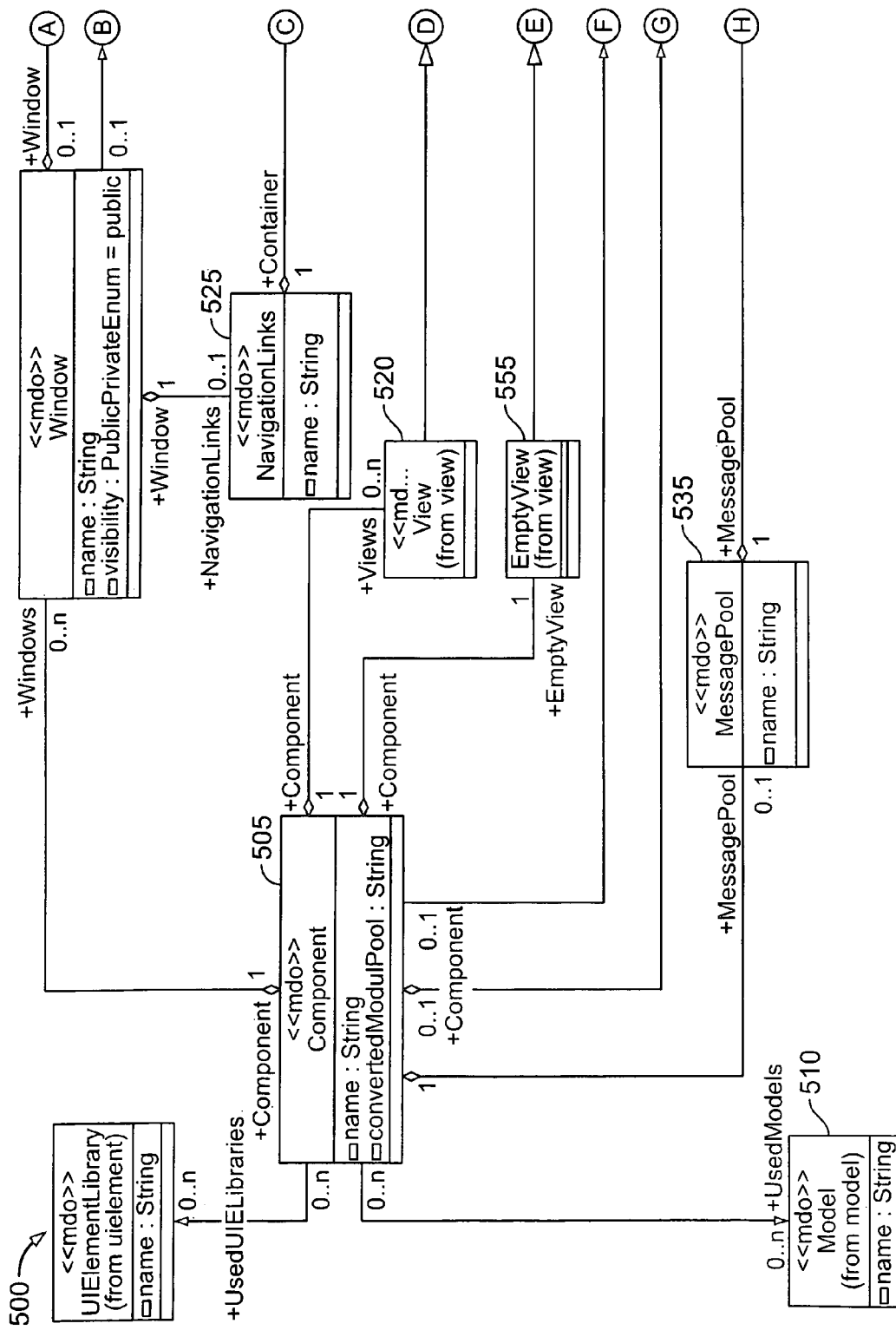
FIGS. 5-10 are block diagrams of portions of another metamodel.
Figure 5B:
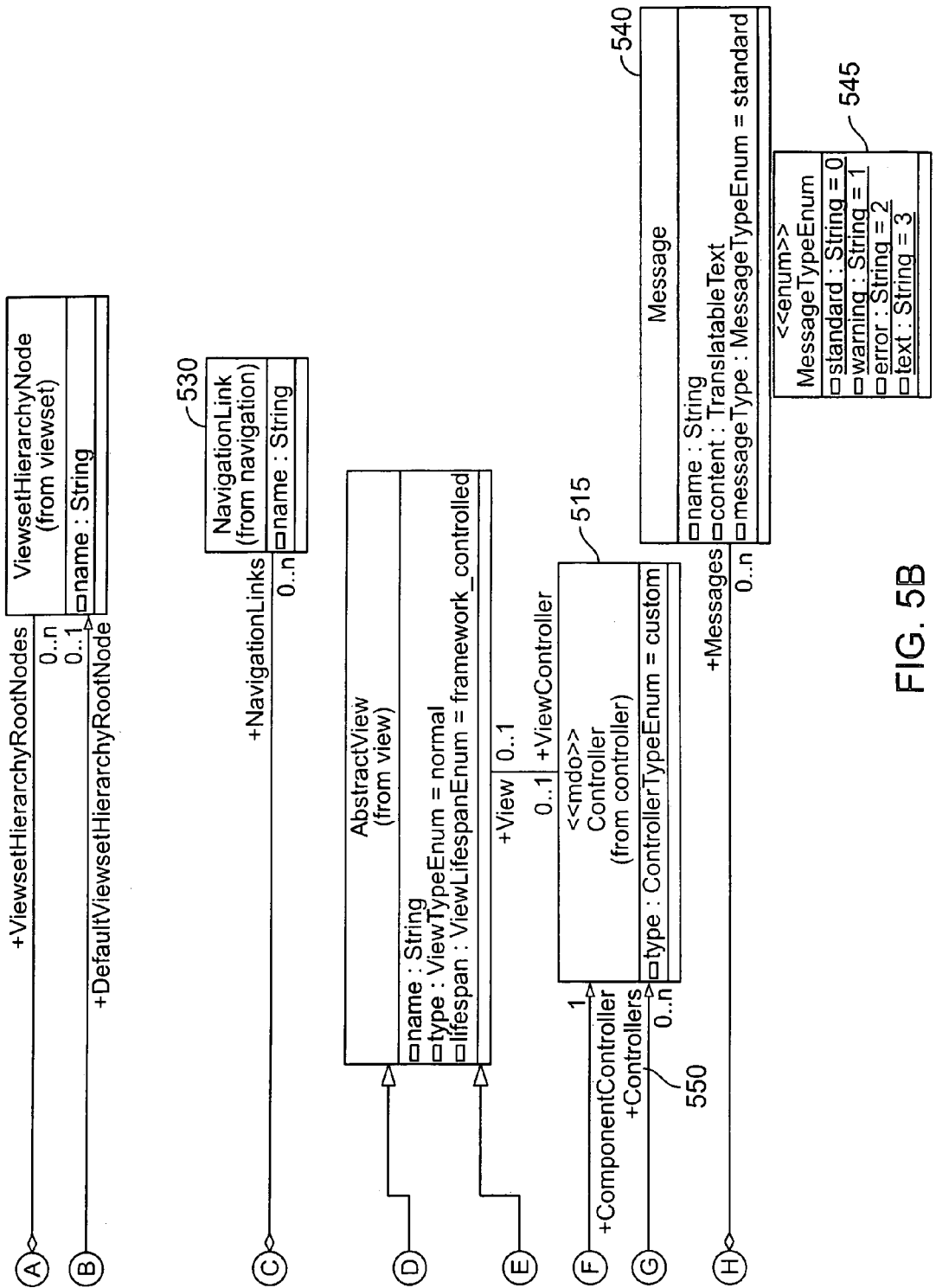

FIGS. 5-10 illustrate more detailed examples of portions of a metamodel, again using UML representations. FIG. 5 illustrates a metamodel portion 500 related to a component of a user interface application, from which an instance such as component instance 400 can be created. Portion 500 includes a class Component 505. Component 505 has two class attributes, "name" and "convertedModulPool", both string type attributes. In the UML representation, each class (except the <<root>> class) has a string-typed attribute "name", either directly or through inheritance. This "name" attribute is part of the unique key of a development object. Component 505 is associated with a model 510. The multiplicity of this association is zero or more instances of class Component 505 to zero or more instances of class Model 510. The name of the endpoint for this association is "UsedModels". Component 505 includes an aggregation of zero or more instances of Controller 515 and zero or more instances of class View 520. Component 505 includes, indirectly, navigation link classes 525 and 530 so that the developer can provide navigation for the component, for example navigation between views of the component or to interface views of embedded components.

Component 505 also includes an aggregation of class MessagePool 535 that represents a set of messages (included in class Message 540) provided by the application component. Message 540 has a class attribute "messageType" that is of type MessageTypeEnum. Class MessageTypeEnum 545 includes an <<enum>> stereotype. As described in more detail below, the <<enum>> stereotype indicates that class MessageTypeEnum 545 is an enumeration type definition. As illustrated, the default value of the MessageTypeEnum attribute type for the class Message 540, if not explicitly set, is "standard", one of four possible enumeration values defined in class MessageTypeEnum 545.

Figure 6A:
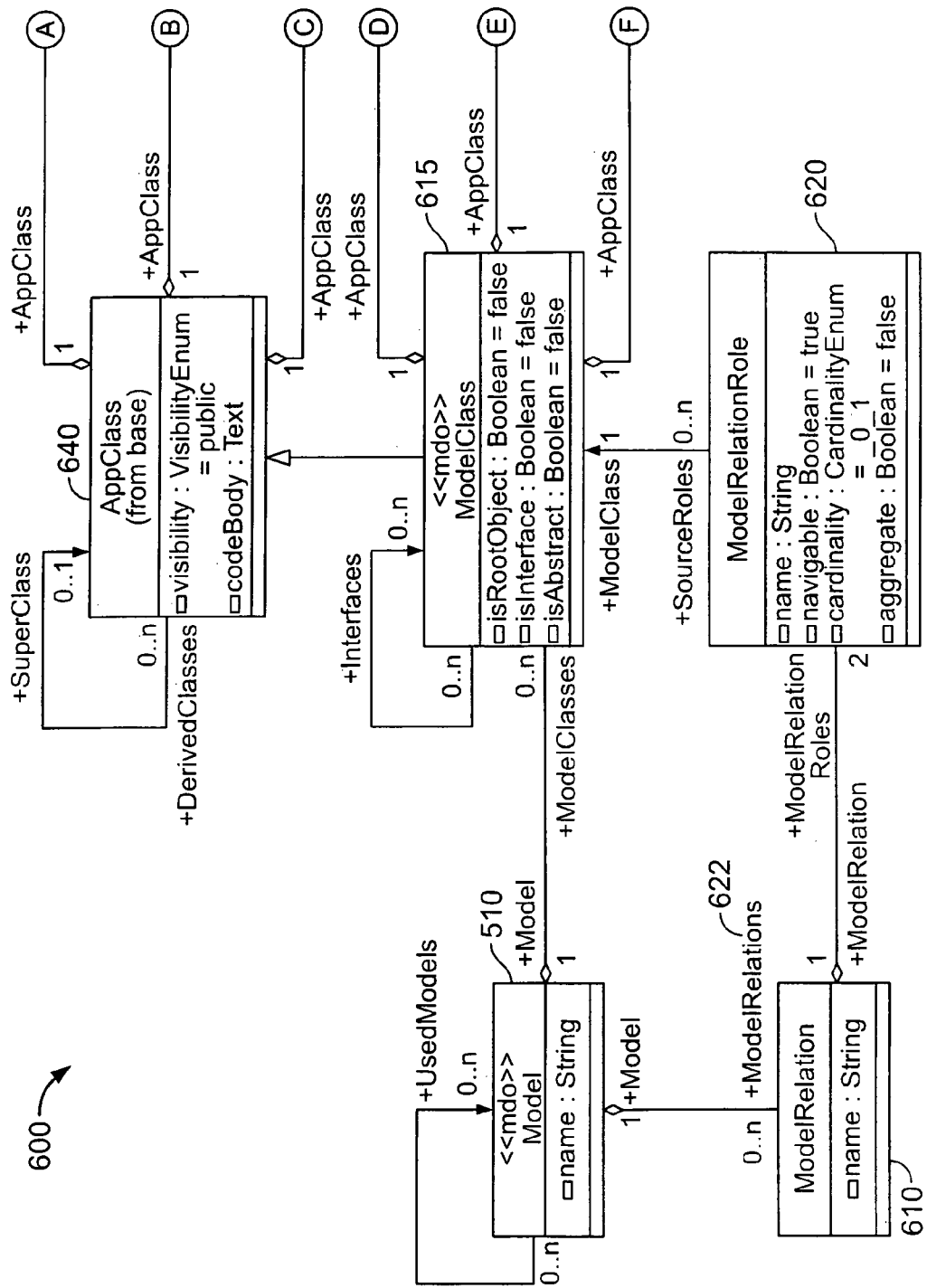
Figure 6B:
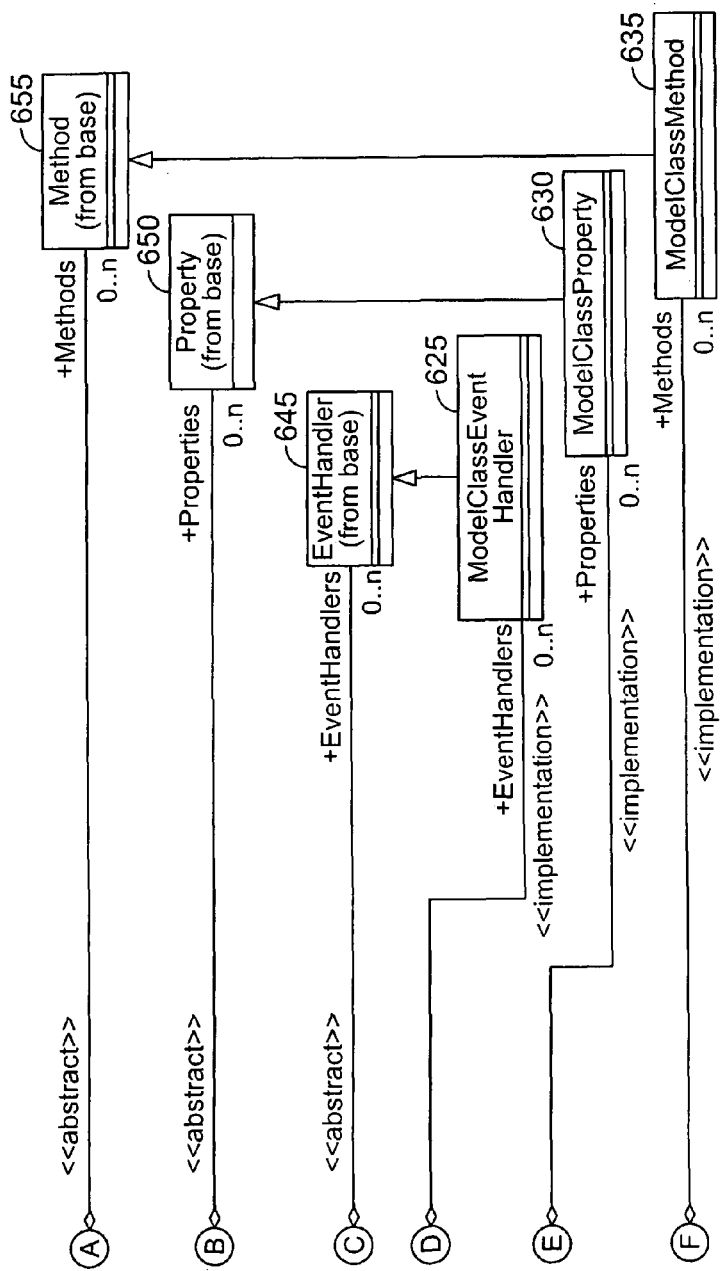

FIG. 6 illustrates a metamodel portion 600 related to a model of a user interface application, from which an instance such as model 403 can be created. Portion 600 includes the class Model 510. Model 510 includes an aggregation of zero or more instances of class ModelRelation 610 and zero or more instances of class ModelClass 615. Where the association or aggregation can deal with multiple instances, the name assigned to that relationship is in plural form. For example, the endpoint of the aggregation relationship between Model 510 and ModelRelation 610 at class ModelRelation 610 is named "ModelRelations" 622. ModelRelation 610 includes an aggregation of two instances of class ModelRelationRole 620. ModelClass 615 includes an aggregation of zero or more instances of the classes ModelClassEventHandler 625, ModelClassProperty 630, and ModelClassMethod 635. ModelClass 615, ModelClassEventHandler 625, ModelClassProperty 630, and ModelClassMethod 635 are illustrated using inheritance. That is, ModelClass 615, ModelClassEventHandler 625, ModelClassProperty 630, and ModelClassMethod 635 are specialized classes of (derived from) classes AppClass 640, EventHandler 645, Property 650, and Method 655, respectively.

Figure 7B:
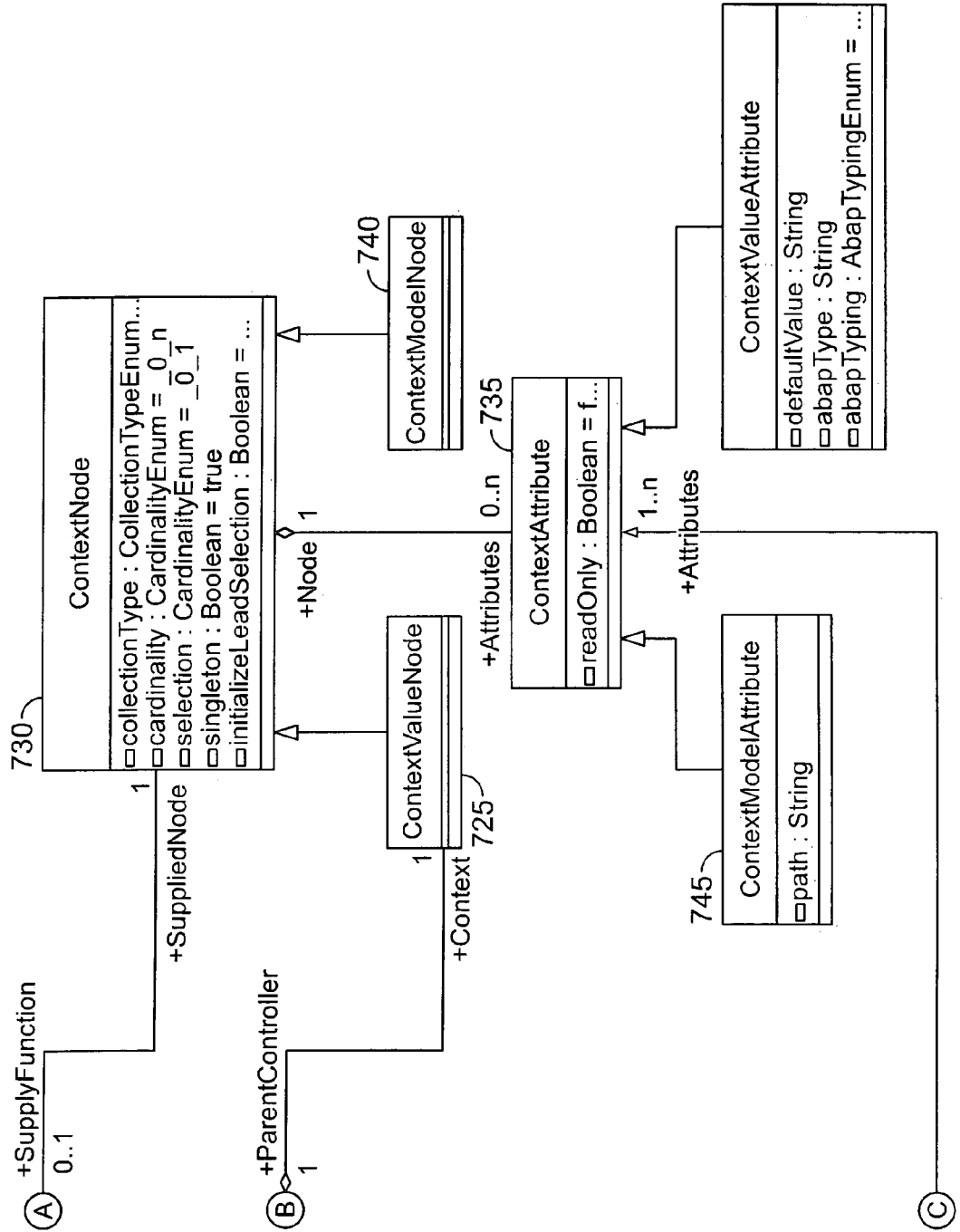
Figure 8:
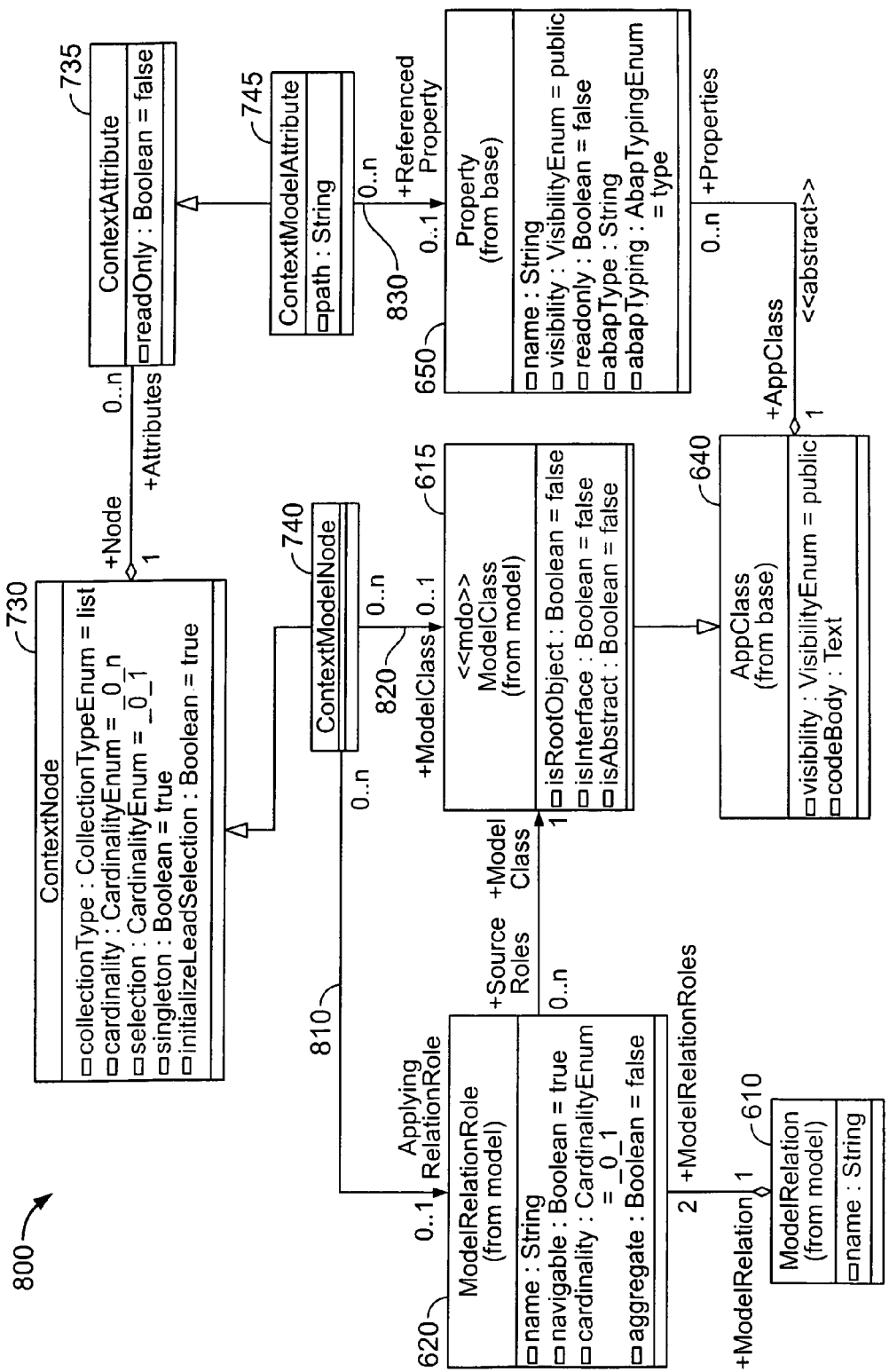

FIG. 7 illustrates a metamodel portion 700 related to a controller of a user interface application, from which an instance such as controller 409 can be created. Portion 700 includes the class Controller 515. Controller 515 includes an aggregation of zero or more instances of the class Action 705, which is a specialized class of class IncomingEvent 708. Controller 515 also includes an aggregation of zero or more instances of the classes ControllerEventHandler 710, ControllerProperty 715, and ControllerMethod 720. Similar to classes 615, 625, 630, and 635 of FIG. 6, classes Controller 515, ControllerEventHandler 710, ControllerProperty 715, and ControllerMethod 720 are specialized classes of classes AppClass 640, EventHandler 645, Property 650, and Method 655, respectively. Controller 515 also includes an aggregation of class ContextValueNode 725, with a multiplicity of one to one. As described above, even though a controller instance can include many nodes, this multiplicity of one-to-one signifies that each controller instance has a single root node. ContextValueNode 725 is a specialized class of a class ContextNode 730. ContextNode 730 includes an aggregation of class ContextAttribute 735. ContextModelNode 740 and ContextModelAttribute 745 are specialized classes of ContextNode 730 and ContextAttribute 735, respectively. ContextModelNode 740 and ContextModelAttribute 745 are used to associate elements of a controller (e.g., controller instance 409) to elements of a model (e.g., model instance 403). FIG. 8 illustrates a metamodel portion 800 that shows relationships between the classes of a controller and the classes of a model. In portion 800, ContextModelNode 740 has associations 810 and 820 with ModelRelationRole 620 and ModelClass 615, respectively. ContextModelAttribute 745 has an association 830 with Property 650. (As illustrated in portion 600, Property 650 is a super class—a generalized base class—of ModelClassProperty 630.)

Figure 9A:
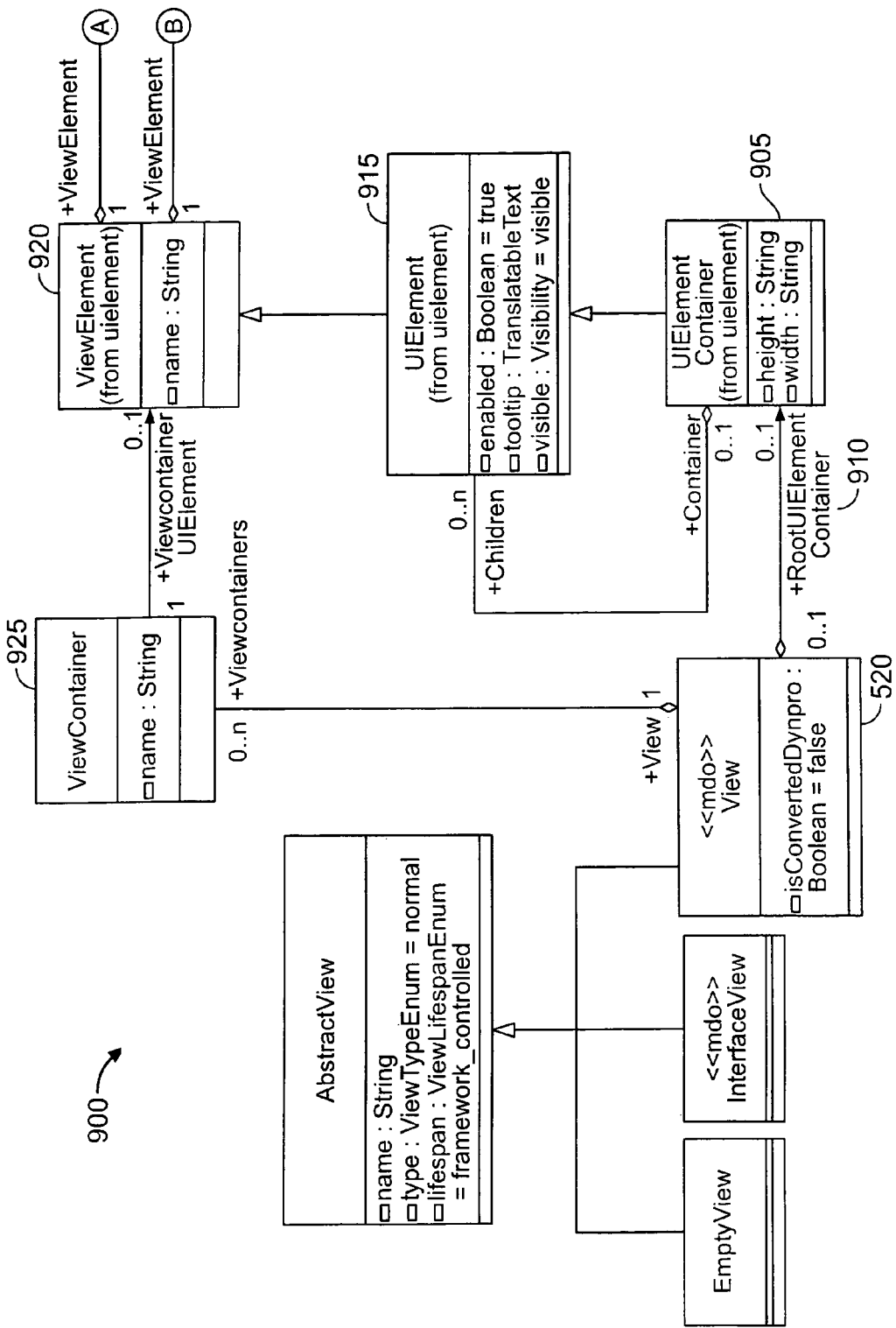
Figure 9B:
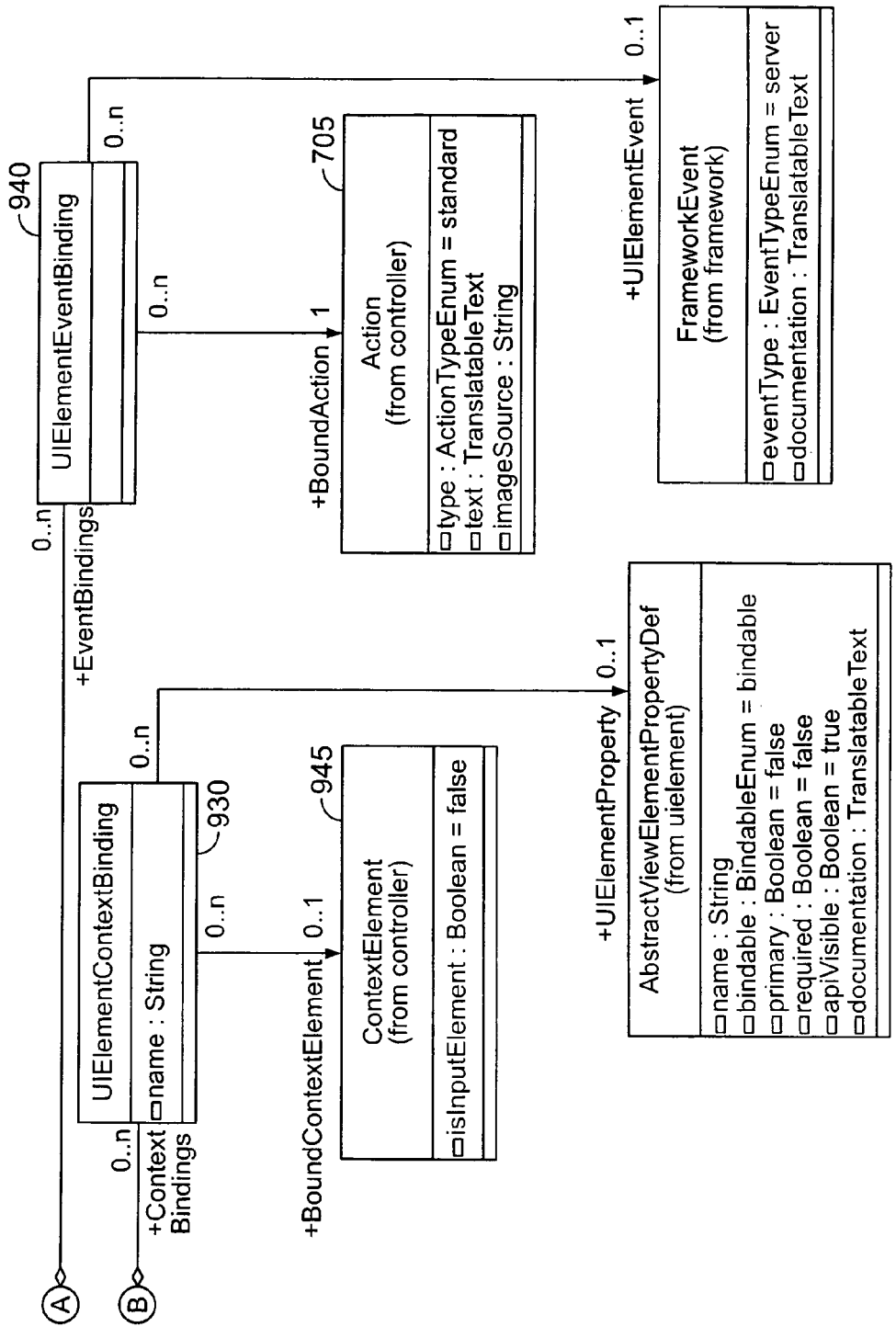

FIG. 9 illustrates a metamodel portion 900 related to a view of a user interface application, from which an instance such as view 406 can be created. Portion 900 includes the class View 520. View 520 includes an aggregation of class UIElementContainer 905. The multiplicity of this relationship is zero or one instances of View 520 to zero or one instances of UIElementContainer 905. As illustrated by the RootElementContainer name 910 assigned to an endpoint of this relationship, this multiplicity indicates that there is a root instance of UIElementContainer 905 for an instance of View 520. UIElementContainer 905 is a specialized class of UIElement 915. UIElementContainer 905, being a root, also includes an aggregation of zero or more instances of UIElement 915, which thus can be instances of UIElementContainer 905 again, allowing for a deeply nested hierarchical layout. UIElement 915 is a specialization of ViewElement 920. View 520 also includes an aggregation of class ViewContainer 925. ViewContainer 925 is associated with ViewElement 920. ViewElement 920 includes an aggregation of classes UIElementContextBinding 930 and UIElementEventBinding 940. UIElementContextBinding 930 and UIElementEventBinding 940 are used to bind elements of a view (e.g., view instance 406) to elements of a controller (e.g., controller instance 409). UIElementEventBinding 940 is associated with Action 705, which, as illustrated in portion 700, is included in Controller 515 as part of an aggregation relationship. UIElementContextBinding 930 is associated with ContextElement 945, which is not illustrated in portion 700.

Figure 10:
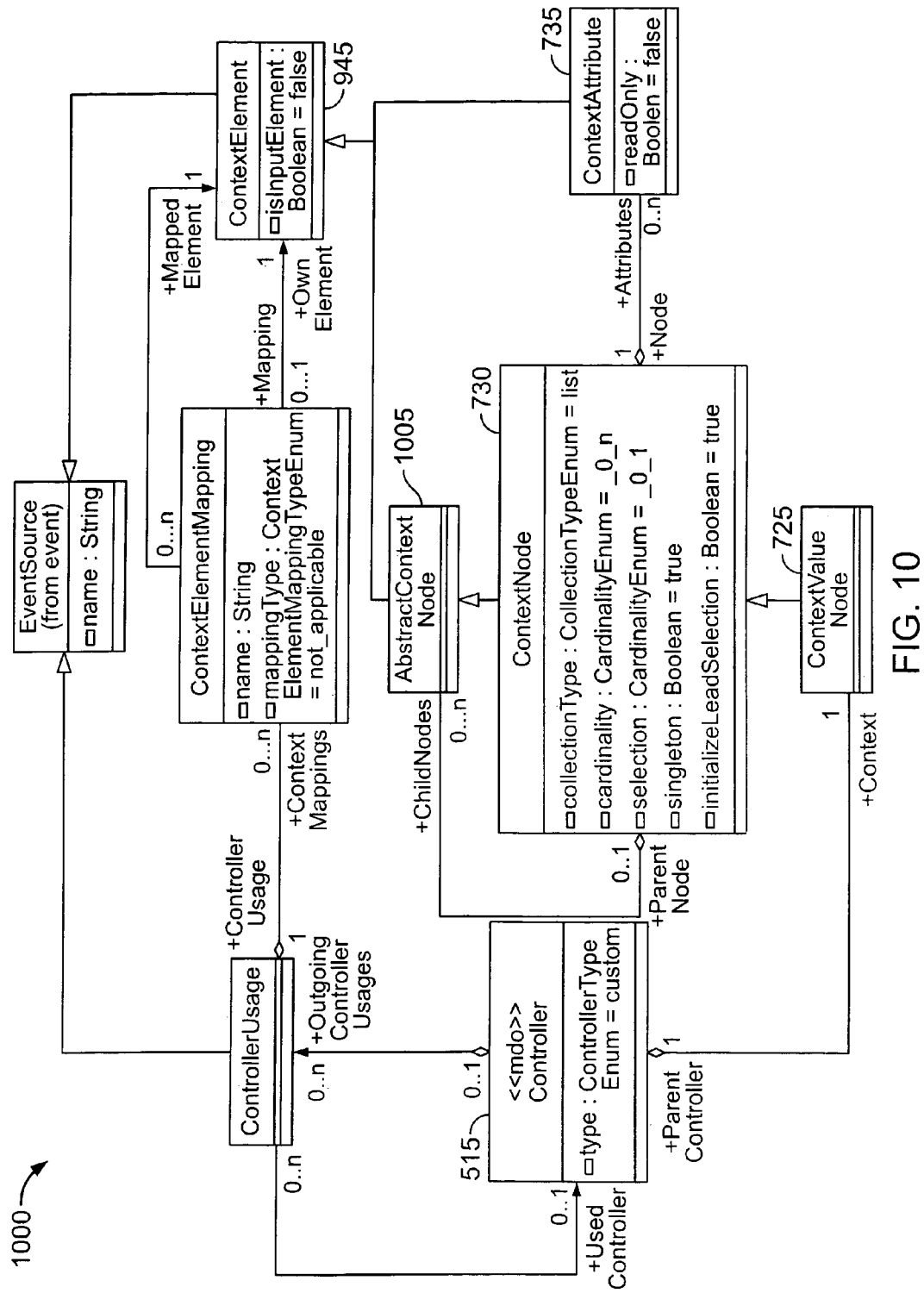

FIG. 10 illustrates a metamodel portion 1000 that includes a class ContextElement 945. As illustrated, ContextElement 945 is a super class of classes AbstractContextNode 1005 and ContextAttribute 735. AbstractContextNode 1005 is a super class of ContextNode 730. Portion 1000 uses AbstractContextNode 1005 to illustrate that the data binding (i.e., association with UIElementContextBinding 930) can be to a child node (e.g., context nodes 415*b*, 415*c*, or 415*d*) of the node tree of a controller (e.g., controller instance 409).

Special Features Using the Customizable Extensions of UML

The portions of the metamodel shown in FIGS. 5-10 illustrate both standard UML constructs and customizable extensions, such as stereotypes and user-defined tagged values. Using these customizable extensions, the metamodel can be extended beyond the standard UML definitions to add additional features and functionality to the derived metadata API 130, thereby including customized features within API 130. These features (examples of which are described below) enable API 130 to be more than just a development layer for creating and persisting development objects. For example, system 100 of FIG. 1 uses customized stereotypes and tagged values to extend the standard UML definitions as described below.

One set of features uses the customizable extensions stereotype and tagged value of UML to customize the metamodel classes. For example, one feature is to use a stereotype <<root>> for a defined class. Using this stereotype indicates that the class is the root class of a metamodel. Each metamodel has one root class. The name of the root class defines the name of the metamodel. By providing a name to a particular metamodel, that metamodel can be referenced by other metamodels, for example, as described by the foreign feature below. Another feature is to use a stereotype <<mdo>> for a class. Using this stereotype indicates that the class is a main development object (MDO) of a metamodel. A main development object indicator specifies that instances of the marked class (i.e., the class marked with the <<mdo>> stereotype) are persisted into one XML file together with any non-MDO children objects. Use of this feature enables the metamodel designer to determine where the file borders are located with respect to the persisted development objects, which can be used to determine the granularity of certain features performed at the main development object level.

For example, in portion 600 illustrated in FIG. 6, class Model 510 includes a <<mdo>> stereotype. The <<mdo>> stereotype indicates that when persisting instances of class Model 510, each of those instances is stored in a separate file.

Further, instances of the classes ModelRelation 610 and ModelRelationRole 620 associated with the instance of class Model 510 are stored in the same file, as those are non-MDO children or ancestor objects of the class Model 510 in the metamodel portion 600. However, instances of ModelClass 615 that are also associated with the instance of class Model 510 are stored in a separate file, because class ModelClass 615 includes a <<mdo>> stereotype and is thus not a non-MDO child object. Because instances of non-MDO class ModelRelationRole 620 are stored with the instance of <<mdo>> class Model 510, whereas instances of ModelClass 615 are stored in a separate file, the association between ModelRelationRole 620 and ModelClass 615 requires a reference to that separate file (e.g., a pointer) stored with the instances of ModelRelationRole 620.

Another feature is to use a stereotype <<foreign:(foreign model name)>> for a class. Using this stereotype indicates that a class is a proxy class for an element of a different metamodel. This feature thus enables associations with classes of other metamodels. Yet another feature is to use a stereotype <<enum>>. Using this stereotype indicates that a class is an enumeration type definition. Use of this feature enables static attributes of a class to be interpreted as enumeration values. For example, in metamodel portion 500 illustrated in FIG. 5, class MessageTypeEnum 545 includes a <<enum>> stereotype. The class attributes define the possible enumeration values for MessageTypeEnum 545 as standard, warning, error, and text.

In addition to using the stereotypes above, the designer of a metamodel can also customize the classes of the metamodel by using the following customized tagged value extensions. One feature for a class uses a tagged value to indicate a root prefix. This feature is applicable for those classes designated as a root class using the <<root>> stereotype. The values for this feature are two lower case characters, chosen as an abbreviation of the metamodel name. The values define the first part of the file extension of the XML files persisted by the derived API (e.g., metadata API 130). Yet another tagged value feature for a class is a MDO suffix. This feature is applicable for those classes designated as an MDO class using the <<mdo>> stereotype. The values for this feature are eighteen lower case characters, chosen to describe the type of class that is defined as a MDO. The values define the second part of the file extension of the XML files persisted by the derived API (e.g., metadata API 130).

Another set of features uses the tagged value extension of UML to customize the attributes of metamodel classes. For example, one tagged value feature is whether an attribute can be nullable. The values for this feature are true and false, with false being the default value. Use of this feature indicates whether the metamodel administrator wants to distinguish the initial value and "null" for this attribute. Another feature in the set of features is defining a customized attribute type "TranslatableText" (this type is used, for example, as the type for the attribute "content" of class Message 540 in metamodel portion 500). This type indicates that values stored in this attribute are language dependent. In some implementations, API 130 persists translatable text in one or more separate files so that other tools can easily access and translate the text into the language in use at runtime. TranslatableText-typed attributes indicate that the derived API 130 includes additional getter/setter-methods including a "language" parameter in the signature, for example a method Message.setContent("de", "Deutscher Text"). This enables the tools to request the class containing this attribute for the TranslatableText instance of this attribute, allowing further manipulations and/or queries (e.g. Message.getContentAsTranslatbaleText( )).

Another tagged value feature for attributes is the translatable text type that defines the type of translatable text. This feature is used to set the values of the associated attribute during XML Localization Interchange File Format (XLIFF) generation. The values for this feature can be a text type supported by the development environment. For example, in a development environment generated by SAP AG of Walldorf (Baden), Germany, the text type can be any SAP Supported XLIFF (S2X) text type. Another tagged value feature for attributes is a maximum length. The values are any positive integer value, with two hundred fifty five being the default value. The values indicate the maximum length allowed for this attribute. This feature can be used, for example, to define the maximum length of a translatable text message. Another tagged value feature for attributes is a descriptive text for a UI. This feature is applicable for attributes of those classes designated as an enumerator class using the <<enum>> stereotype. The values for this feature are short strings of text. The values enable a model administrator to describe a particular enumerator attribute when the enumerator attribute name itself is not self-explanatory.

Another set of features uses the tagged value feature of UML to customize the relationships between metamodel classes. For example, one tagged value feature for relationships between metamodel classes is an ordered collection. This feature is applicable for one-to-many relationships between classes. The values for this feature are true and false, with false being the default value. The values indicate whether the objects (i.e., class instances) on the "many" side of a relationship are sequentially ordered, thereby allowing such orderings to be maintained and manipulated explicitly. Another tagged value feature for relationships between metamodel classes is a singular name for an endpoint of a relation.

This feature is applicable for an endpoint of a relation that has a "many" cardinality (e.g., . . . n, *). The values are strings with singular names. For example, in metamodel portion 600, endpoint 622 is named ModelRelations because the cardinality of ModelRelation 610 is zero-to-many. During API derivation, the process looks to the endpoints of the relations, so that the correct direction is maintained. For example, in the aggregation relationship between model class 510 and model relation class 610, the direction of the relationship is that model class 510 is the aggregation (e.g., whole) and model relation class 610 is the constituent part(s). If an API method relates to a constituent part, the endpoint ModelRelations 622 is used. To create methods for the API, the process needs to make a distinction between singular and plural forms of an endpoint, so as to differentiate between interaction with one instance at the endpoint or with multiple instances at the endpoint (e.g., an array or aggregation). In English, the singular form is often simply the plural form without the "s", but there are many words for which this is not the case (e.g., where the plural endpoint is children and the singular endpoint is a child). Use of these values ensures that it is easy to differentiate between methods that relate to a single instance and methods that relate to a plurality of instances, and makes the derived API more understandable to read.

Another set of features uses the tagged value features of UML to customize the classes, attributes, and relations of a metamodel for platform specific features. For example, system 100 can use the features described below to customize a metamodel so that the derived API can accommodate special needs of a target platform (e.g., the Advanced Business Application Programming (ABAP) platform, available from SAP AG of Walldorf (Baden), Germany. One tagged value feature is a platform exclusion. This feature can be specified at the class or attribute level. The platform exclusion values are "for all platforms", "for ABAP only", and "for non-ABAP only", with "for all platforms" being the default value. These values indicate whether the class or attribute is only relevant for a specific platform ("for ABAP only"), should exclude a specific platform ("non-ABAP only"), or is platform-neutral ("for all platforms").

Another tagged value feature is a platform-specific name for a class, attribute, or endpoint of a relation. The values are valid names for specific platforms. This feature is needed, for example, when certain platforms have length restrictions or special character restrictions. In such cases, the values indicate an allowable name for a class, attribute, or endpoint relation that overrides the name given in the API derivation process. For example, at one point in an example derivation process, the metamodel is represented as Java objects. The goal is to derive an API that includes ABAP classes for use on an ABAP platform. The name of one of the Java objects may be too long to be a valid ABAP class name. In such a case, the value for the platform specific name is a valid ABAP class name that overrides the Java class name. Although ABAP is used for illustration, other languages, such as C#, can be used, with tagged values for valid C# names also included.

Other features using a tagged value can be defined to enable features for specific platforms. For example, for an ABAP platform, a lockable feature can be defined as a tagged value for a class. The values for this feature are yes and no, with no being the default value. These values indicate whether an ABAP metadata API can be used to acquire a table lock for a class. As another example, an attribute type tagged value can be defined for an attribute. The values are any valid ABAP types. These values can be used to define specialized attribute types for use on an ABAP platform.

API and XML Schema Derivation Process

Figure 11:
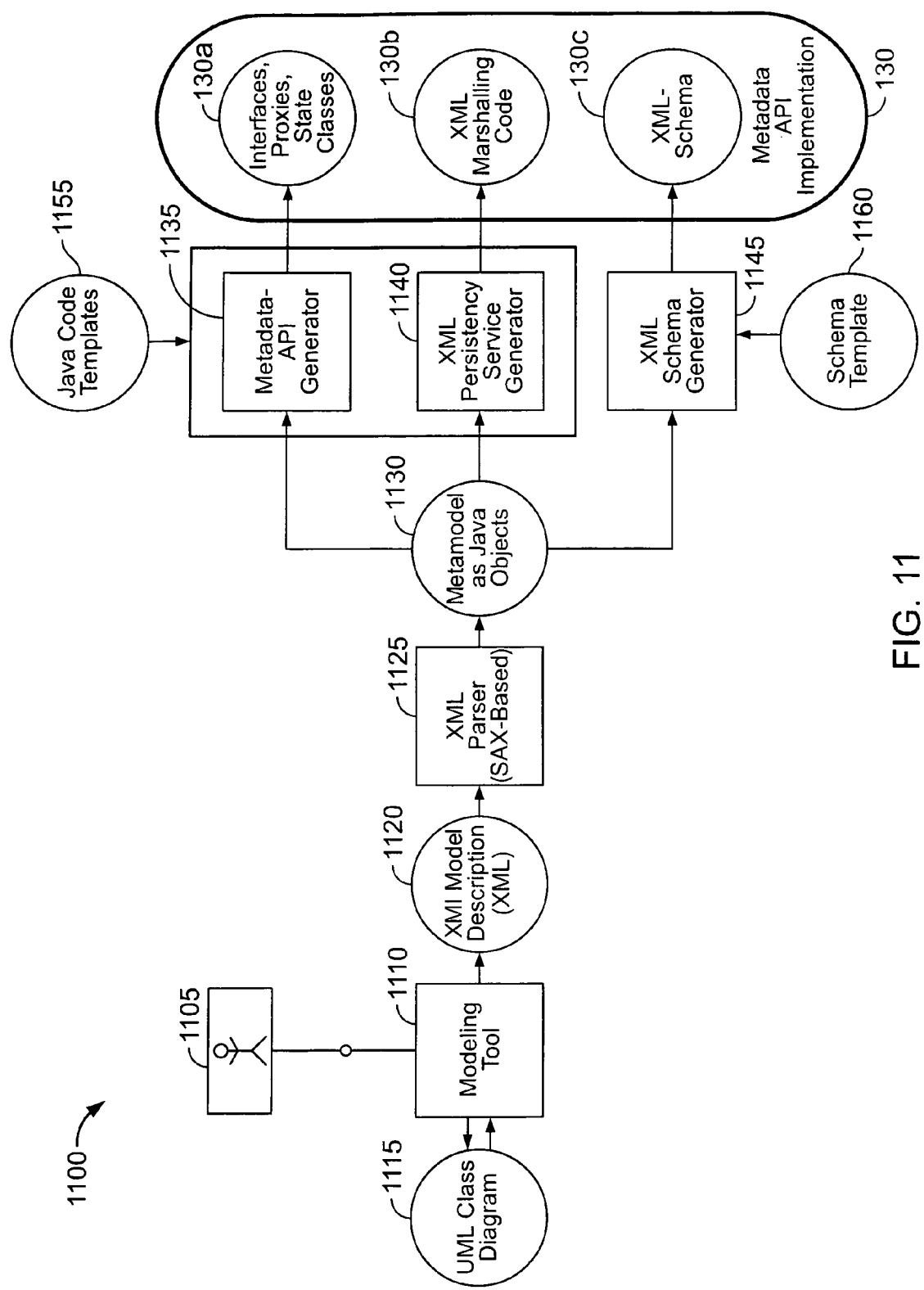
FIG. 11 is a block diagram of a process for API and XML schema derivation.

FIG. 11 illustrates a sample process 1100 for generating an API (e.g., metadata API 130 of system 100) and/or an XML schema from a metamodel. The metamodel in this example is represented using UML, and has the standard and customizable constructs described above. In process 1100, a metamodel administrator 1105 uses a modeling tool 1110 to create and/or modify a UML class diagram 115 representing the metamodel (e.g., metamodel 200, metamodel 300, or the metamodel portions in FIGS. 5-10) that serves as the basis for the derivation. Once a metamodel is complete, process 1100 generates a standards-based XML Metadata Interchange (XMI) model description 1120. That is, XMI model 1120 is a representation of the UML metamodel 1115, written in XML and described according to the XMI standard. Process 1100 parses the XMI model description 1120 using a Simple API for XML (SAX)-based XML parser 1125 to generate a representation of the metamodel as a set of intermediate objects 1130 (e.g., Java objects). (The SAX technical specification can be found, for example, at http://www.saxproject.org.) The Java objects 1130 represent the document object model (DOM) of the metamodel (e.g., represented as a DOM tree). Process 1100 uses Java objects 1130 as inputs to generators 1135, 1140, and 1145 to generate code that is included in metadata API 130. As described in more detail below, metadata API 130 includes a portion 130a that includes interfaces, proxies, and state classes, a portion 130b that includes XML marshalling code, and a portion 130c that includes an XML schema. Process 1100 also uses Java code templates 1155 and schema templates 1160 in the generation process to generate metadata API 130.

Example Derivations

One result of API derivation process 1100 is XML schema 130c that defines the XML schema for the persisted development objects, which may be stored, for example, in local cache 136 and repository 110. The following are example development objects that use an XML schema derived from the metamodel portions illustrated in FIGS. 5-10. The first example development object is an instance of class Component 505 (from metamodel portion 500), which is represented as follows:

```
<?xml version="1.0" encoding="UTF-8" ?>
<Component xmlns=http://xml.sap.com/2002/10/metamodel/webdynpro
    xmlns:IDX="urn:sap.com:WebDynpro.Component:1.2" mmRelease=
    "6.30" mmVersion="1.2" mmTimestamp="1057920913843"
    name="Comp1"
    package="components" masterLanguage="en">
  <Component.Controllers>
    <Core.Reference package="views" name="View1" type=
    "Controller" />
    <Core.Reference package="controllers" name="Comp1Ctlr"
    type="Controller" />
    <Core.Reference package="controllers" name="MyController"
    type="Controller" />
  </Component.Controllers>
  <Component.EmptyView>
    <EmptyView name="EmptyView" />
  </Component.EmptyView>
  <Component.Views>
    <Core.Reference package="views" name="View1" type="View" />
  </Component.Views>
  <Component.ComponentController>
    <Core.Reference package="controllers" name="Comp1Ctlr"
    type="Controller" />
  </Component.ComponentController>
</Component>
```

Taking the XML file in order, the first line defines the version and encoding of the XML file. The next four lines define the attributes of this instance. In order to reduce the necessary storage space, the XML file includes those attributes that differ from the defined default value. If an attribute is not included in the XML file, the default value from the metamodel is used. For example, the name of this instance is "comp1". The next seven lines define the aggregation relationship between class component 505 and class controller 515. The schema uses the class name first, followed by a dot, followed by the name of the endpoint of the relationship (referred to as the role name). In this case, the endpoint 550 is named "controllers" and so the aggregation relationship is named "Component.Controllers". As defined in these seven lines, there are three instances of class Controller 515 (defined by the "type" attribute) included in this instance of Component 505. Because Controller 515 is a MDO, the definitions of those instances are not stored in the same XML file as Component 505; instead, references to the three instances are stored in this XML file. The next three lines define the aggregation relationship between class component 505 and class EmptyView 555, which has the identical role name EmptyView. Class EmptyView 555 is a non-MDO child, so the actual definition of the instance is included in the XML file with Component 505. In this case, the instance has a name EmptyView. Component.Views and Component.ComponentController define relationships of Component 505 with classes View 520 and Controller 515, respectively. Because classes View 520 and Controller 515 are MDOs, the definitions of the instances of those classes are also references to other files that contain the instances.

The second example development object is an instance of class Controller 515 from metamodel portion 700. This instance, named MyController, is the instance that was referenced in the Component instance example above and is implemented as follows:

```
<?xml version="1.0" encoding="UTF-8" ?>
<Controller xmlns=http://xml.sap.com/2002/10/metamodel/webdynpro
xmlns:IDX="urn:sap.com:WebDynpro.Controller:1.2" mmRelease="6.30"
mmVersion="1.2" mmTimestamp="1057920913843"
name="MyController" package="controllers" masterLanguage="en">
  <Controller.Parent>
    <Core.Reference package="components" name="Comp1"
      type="Component" />
  </Controller.Parent>
  <Controller.Context>
    <ContextValueNode name="Context" />
  </Controller.Context>
<Controller>
```

Taking the XML file in order, the first line defines the version and encoding of the XML file. The next four lines define the attributes of this instance. For example, the name of this instance is "MyController", and the package is "controllers". Both of these attribute values were used in the Component instance to reference this Controller instance. The next three lines define a reference to the parent of this instance, the Component instance. The next three lines define the aggregation relationship between class Controller 515 and class ContextValueNode 725, which has the role name Context, thus making the tag "Controller.Context". Class ContextValueNode 725 is also a non-MDO child, so the actual definition of the instance (named Context) is included in the XML file.

The third example development object is another instance of class Controller 515, which includes instances of a recursive context node 1005 and a context attribute 735 from metamodel portion 1000. This instance, named View1 because this instance is a view controller, is the instance that was referenced in the component instance example above. This instance is as follows:

```
<?xml version="1.0" encoding="UTF-8" ?>
<Controller xmlns=http://xml.sap.com/2002/10/metamodel/webdynpro
xmlns:IDX="urn:sap.com:WebDynpro.Controller:1.2" mmRelease="6.30"
mmVersion="1.2" mmTimestamp="1057920913843" name="View1"
type="view" package="views" masterLanguage="en">
  <Controller.Parent>
    <Core.Reference package="components" name="Comp1"
      type="Component" />
  </Controller.Parent>
  <Controller.Context>
    <ContextValueNode name="Context">
      <ContextNode.ChildNodes>
        <ContextValueNode name="valueNode1">
          <ContextNode.Attributes>
            <ContextValueAttribute name="valueAttribute1">
              <ContextValueAttribute.Type>
                <Core.ForeignReference modelName="DtDictionary"
                  package="com.sap.dictionary" name="string"
                  type="DtSimpleType" />
              </ContextValueAttribute.Type>
            </ContextValueAttribute>
          </ContextNode.Attributes>
        </ContextValueNode>
      </ContextNode.ChildNodes>
    </ContextValueNode>
  </Controller.Context>
  <Controller.Actions>
    <Action name="action3" />
    <Action name="action2" />
    <Action name="action1" />
  </Controller.Actions>
  <Controller.View>
    <Core.Reference package="views" name="View1" type="View" />
  </Controller.View>
</Controller>
```

Taking the XML file in order, the first line defines the version and encoding of the XML file. The next four lines define the attributes of this Controller instance. For example, the name of this instance is "View1", and the package is "views". Both of these attribute values were used in the Component instance specified above to reference this Controller instance. In this case, the Controller instance has relationships to other instances, as noted according to the Class.RoleName schema. The next three lines define a reference to the parent of this instance, the Component instance. The next eighteen lines define the aggregation relationship between class Controller 515 and class ContextValueNode 705, which has the role name Context. Class ContextValueNode 725 is a non-MDO child, so the actual definition of the instance is included in the XML file. The instance of ContextValueNode 725 has the name Context. As illustrated in metamodel portion 1000, ContextValueNode 725 is a specialization of ContextNode 730 and thus inherits the properties from that class. Class ContextNode 730 has an aggregation relationship named ChildNodes with class Abstract ContextNode 1005. ContextNode.ChildNodes defines an instance of class AbstractContextNode 1005 with a name "valueNode1". AbstractContextNode 1005 is an abstraction of class ContextNode 730. AbstractContextNode 1005 represents the allowability of a node tree structure for context node classes (e.g., nodes 415 of component 400). Class ContextNode 730 has an aggregation relationship named Attributes with class ContextAttribute 735. ContextNode.Attributes defines an instance of class ContextAttribute 735 with a name "valueAttribute1". The type of the attribute for this instance relies on a definition outside of the metamodel, a data dictionary with the name DtDictionary, so a foreign reference is used.

The three lines between Controller.Actions define the aggregation relationship between class Controller 515 and class Action 705, which has the role name Actions. Class Action 705 is a non-MDO child, so the XML file includes the actual definition of the three instances of the class. In this case, the instances have the names action3, action2, and action1.

The overview section above describes how application developer 160 creates development objects (e.g., the example Component instance and the Controller instances above) by composing them in a declarative way using metadata. There are times, however, when application developer 160 needs to generate some user-defined code for the user interface application. (This is customized code that is not produced by generator 140.) The declarative process contains user coding areas where application developer 160 can insert user-defined code. To keep the insertion of user-defined code consistent with the metamodel, all user-defined code is stored in the same files as the MDO class with which the user-defined code is associated. In one implementation, all of the user-defined code is stored together as one block in the MDO. Extending the controller instance View1 above, the following example MDO illustrates this user-defined code block contained within the "AppClass.CodeBody" tags, inserted between the Controller definition and the Controller.Parent relation definition:

```
<?xml version="1.0" encoding="UTF-8" ?>
<Controller xmlns=http://xml.sap.com/2002/10/metamodel/webdynpro
xmlns:IDX="urn:sap.com:WebDynpro.Controller:1.2" mmRelease=
"6.30"
mmVersion="1.2" mmTimestamp="1057920913843" name="View1"
type="view"
```

-continued

```
package="views" masterLanguage="en">
  <AppClass.CodeBody>
    <Core.Text><![CDATA[// -------------------------
package com.sap.test.flight.comp;
//@@begin imports
import com.sap.test.flight.comp.wdp.IPrivateSearchView;
//@@end
//@@begin documentation
//@@end
public class View1
{
...
  private final IPrivateView1 wdThis;
  private final IPrivateView1.IContextNode wdContext;
  public View1(IPrivateView1 wdThis)
  {
    this.wdThis = wdThis;
    this.wdContext = wdThis.wdGetContext( );
  }
  //@@begin javadoc:onAction1(ServerEvent)
  /** declared validating event handler */
  //@@end
  public void onAction1
(com.sap.tc.webdynpro.progmodel.api.IWDCustomEventwdEvent)
  {
    //@@begin onAction1(ServerEvent)
    wdThis.wdFirePlug( );
    //@@end
  }
...
}
]]></Core.Text>
  </AppClass.CodeBody>
  <Controller.Parent>
    <Core.Reference package="components" name="Comp1"
       type="Component" />
  </Controller.Parent>
```

Referring back to FIG. 11, another result of API derivation process 1100 is a generated API interface of portion 130a. As illustrated, process 1100 generates API interfaces of portion 130a using Java code templates 1155. An example of a generated interface is shown below; this sample interface is for class MessagePool 535 of metamodel portion 500 is:

```
package com.sap.ide.metamodel.webdynpro.component;
import com.sap.ide.metamodel.general.MainDevelopmentObject;
public interface MessagePool extends WebDynproObject,
MainDevelopmentObject
{
  // get aggregating parent
  public Component getComponent( );
  // Messages (to-n-aggregation)
  public Message createMessage(String messageName) throws
  CreateException;
  public Message createMessage(String messageName, int position)
    throws
  CreateException;
  public boolean hasMessage(String messageName);
  public int getMessageCount( );
  public Message getMessage(String messageName);
  public Message getMessage(int position);
  public Message[ ] getMessages( );
  public int getMessagePosition(Message object);
  public void moveMessage(int fromPosition, int toPosition);
}
```

Process 1100 generates each of the lines above for the MessagePool class interface by following a template. For example, to generate the first line, "package com.sap.ide.metamodel.webdynpro.component;", process 1100 uses the following portion of a template:

```
#if ($class.isEnum)
#parse("Enumeration.vm")
#else
#if ($class.package)
package ${rootPackage}.${class.package};
#else
package ${rootPackage};
#end
```

Class MessagePool 535 is not an enumeration class (e.g., like class MessageTypeEnum 545), so the first if statement is not applicable. In this illustrative example, the package for the class exists, so class.package is true and the process 100 generates the package statement for the interface. If a class does not belong to any specified package, the template uses the "root package" only, which is the reason for the else statement.

To generate the next line, "import com.sap.ide.metamodel.general. MainDevelopmentObject;", process 1100 uses the following portion of a template:

```
#if ($class.isMDO)
  import com.sap.ide.metamodel.general.MainDevelopmentObject;
#end
```

Class MessagePool 535 is a MDO, so the first if statement is true and the corresponding line is generated.

To generate the next line, "public interface MessagePool extends WebDynproObject, MainDevelopmentObject", process 1100 uses the following portion of a template:

```
#if ($class.isMDO)
  public interface ${class.name} extends ${root}Object,
  MainDevelopmentObject
#end
{
```

Again, MessagePool 535 is an MDO, so process 1100 generates the line, with the class name being MessagePool and the root being WebDynpro. At this point in the template, process 1100 also adds the open bracket "{" that is contained after the end statement of the template. This is an example where there is no condition, so process 1100 automatically adds the bracket.

To generate the next two lines, "// get aggregating parent" and "public Component getcomponent( );", process 1100 uses the following portion of a template:

```
############ macro for incoming
aggregations ################
#macro(incomingAggregationCode $aggregation)
#set ($role = $aggregation.parent)
#if ($role.navigable && !$aggregation.isImplementation)
  // get aggregating parent
#if ($role.roleClass.isRoot)
  public ${role.roleClass.name}Root get${role.name}( );
#else
  public ${role.roleClass.name} get${role.name}( );
#end
```

For this part of the template, the set statement sets the role to the aggregating parent, which for MessagePool 535 is Component 505. The condition ($role.navigable && !$aggregation.isImplementation) in this case is true, so process 1100 inserts the corresponding comment line into the interface. In this example, the role.navigable condition verifies whether this role is applicable (e.g., reachable from the current object). The aggregation.isImplementation condition verifies if the aggregation.isImplementation attribute is true, indicating that aggregation is an implementation, not an interface. The class Component 505 is not a root, so process 1100 jumps to the else statement to generate the corresponding get method.

The template continues with additional conditional and non-conditional statements similar to the statements above. Non-conditional statements (e.g., the open bracket above), are used if the corresponding output is to be included in all interfaces. Process 1100 steps through the additional statements to generate the other methods in the interface for the MessagePool 535 class. For example, to generate the method line "public Message createMessage(String messageName, int position) throws CreateException", process 1100 uses the following portion of a template:

```
#if ($aggregation.isOrdered)
    public ${role.roleClass.name} create${role.singularName}(String
${role.singularNameFirstCharLower}Name, int position) throws
CreateException;
#if ($role.roleClass.isDerivedMDO)
    public ${role.roleClass.name} create${role.singularName}(String
${role.singularNameFirstCharLower}Name, SourcePathIdentifier
sourcePathIdentifier, int position) throws CreateException;
#end
```

This portion of the template illustrates use of two customization features described above. The first feature illustrated is an ordered aggregation. The first if statement above verifies whether the tagged value ordered collection for the aggregation is true. In this example, the MessagePool 535 class is an ordered collection, so process 1100 adds the create method of the first if statement in the template to the interface. Specifically related to an ordered collection, this generated create method has a parameter "position", which is an integer representing the particular order of a message instance in the ordered aggregation.

This portion of the template also illustrates the second customization feature, the tagged value singular role name. The template inserts the singular role name (i.e., role.singularName) into the create statement to represent that a single instance of a Message with a particular position will be created using this method. Note also that in some places a "First-CharLower" suffix is used when the first letter of an inserted name needs to be in lower case. For example, the template portion includes a variable "$ {role.singularNameFirstCharLower}" which causes process 1100 to insert "message" with a small "m" into the generated method command "public Message createMessage(String messageName, int position) throws CreateException;" in the "messageName" parameter.

Figure 12:
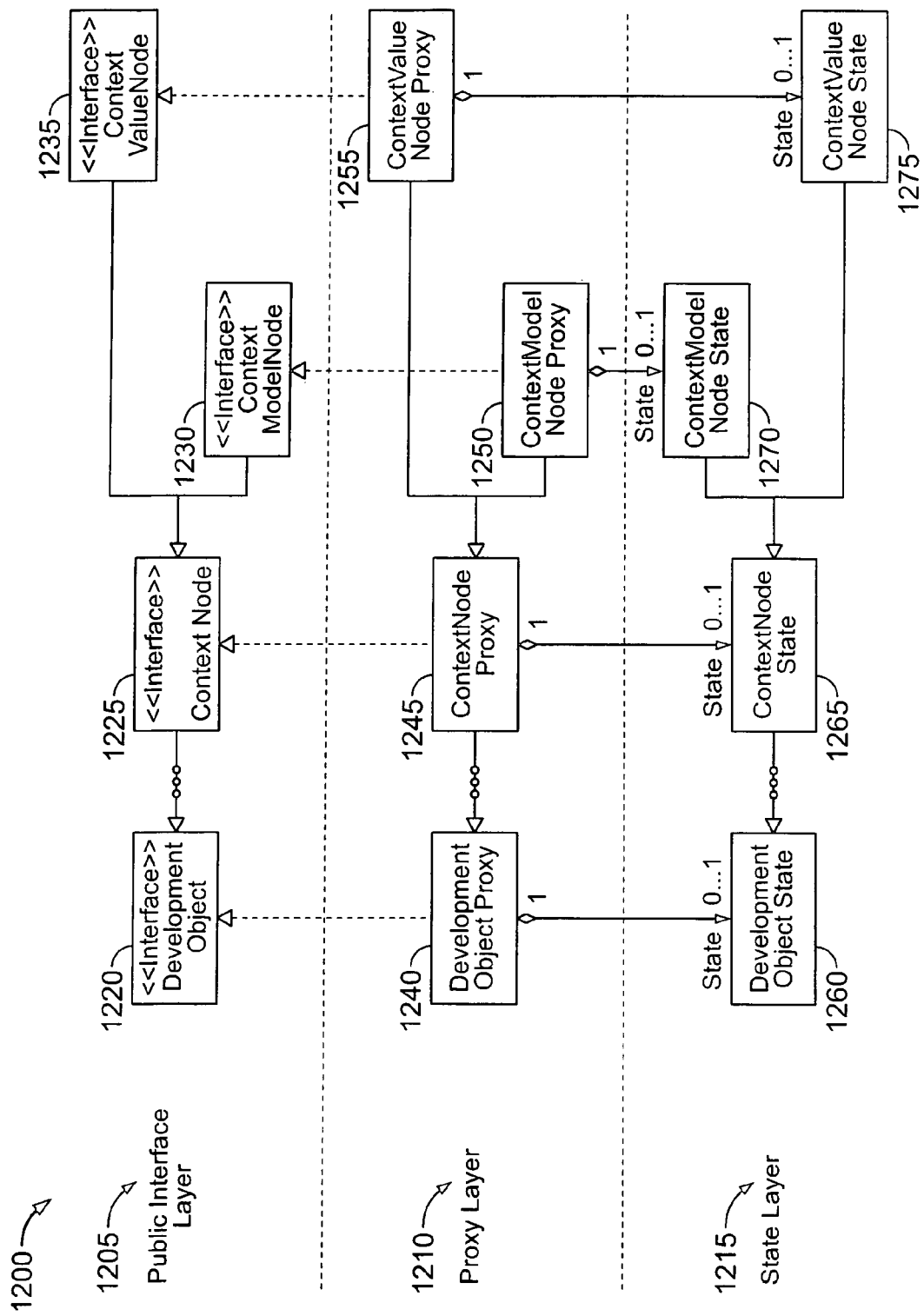
FIG. 12 is a block diagram of the decoupled layers of a derived API.

The example derived interface described above is one layer of the API portion 130*a*. FIG. 12 illustrates a relation 1200 between an interface layer 1205, a proxy layer 1210, and a state layer 1215. The interface layer 1205 represents the interfaces, based on the metamodel, that enable the application developer 160 to interact with the development objects (e.g., using tools 125). For example, the interface described above for the MessagePool 535 class is an example of the interface. Proxy layer 1210 controls the identity of the instances of development objects with which the application developer 160 is interacting, and state layer 1215 holds the content of those identified development object instances. Relation 1200 is represented using a UML class diagram. In the illustrated example, interface layer 1205 includes interfaces 1220, 1225, 1230, and 1235. For this particular illustrated example, interface 1220 represents an interface for a development object that includes a context node interface 1225 (e.g., based on class ContextNode 730). Reflecting the relationships in the metamodel (e.g., metamodel portion 700), interface 1225 is a generalized class of specialized classes 1230 and 1235, which are interfaces that correspond to classes ContextModelNode 740 and ContextValueNode 725, respectively. In one example, process 1100 derives each of these interfaces using a template, as described above.

For each interface 1220, 1225, 1230, and 1235, there is a corresponding proxy class 1240, 1245, 1250, and 1255, respectively. The dotted lines in the UML diagram represent that the proxy classes 1240, 1245, 1250, and 1255 implement the interfaces 1220, 1225, 1230 and 1235, respectively. Proxy classes 1240, 1245, 1250, and 1255 aggregate the state classes 1260, 1265, 1270, and 1275, respectively. The separation and decoupling of API portion 130*a* into layers 1205, 1210, and 1215 allow system 100 to provide features such as load-on-demand, reload, deletion control, and lock management for development objects.

Figure 13:
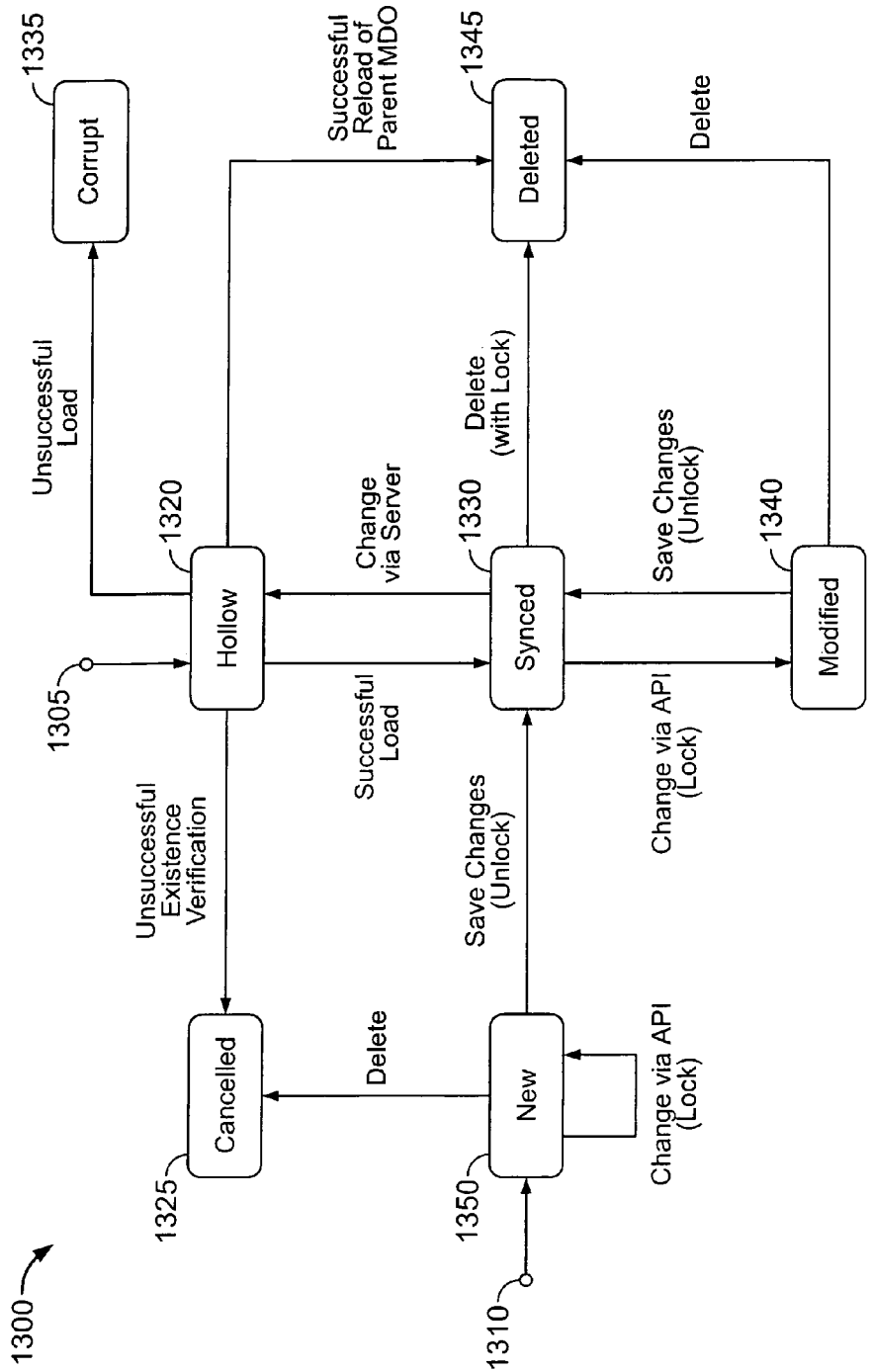
FIG. 13 is a state diagram of a development object interacted with through a derived API.

As an example, FIG. 13 illustrates a state diagram 1300 of the transaction states of a development object. State diagram 1300 has two entry points 1305 and 1310. A request to modify an existing development object starts at entry point 1305 when, for example, there is an indication (from application developer or another reference) that an instance already exists for the requested development object. In this scenario, the development object starts in a hollow state 1320. Hollow state 1320 represents a state where API 130 attempts to find an actual file containing the requested development object and resolve all of the external aggregations and associations. If the references in the development object cannot be resolved and no file can be found, the state of the development object becomes a final cancelled state 1325. Final cancelled state 1325 represents that the hollow development object (e.g., the proxy) is deleted from memory, as system 100 cannot retrieve the actual file representing that development object.

If all references are resolved and the file containing the requested development object is successfully loaded (e.g., retrieved from repository 110 and copied to local cache 135), then the development object enters a synced state 1330, which signifies that the development object (e.g., proxy) is synced to an actual file. If all references are resolved, but there is a problem loading the file, the development object enters a final corrupt state 1335. From synced state 1330, a developer can lock the development object and make changes to the development object, causing the development object to enter a modified state 1340. When the changes are saved, the development object returns to synced state 1330 (e.g., proxy changes are committed to the file). From either state 1330 or state 1340, a delete of the development object causes the development object to enter a final delete state 1345. When in a deleted state 1345, system 100 marks the development object file as deleted. The file itself is not destroyed because until a save takes place, the metadata API 130 allows rolling back to the previous data state, represented by the former data state still included in the file. Whenever a hollow object's parent MDO is loaded, the hollow object must either go into the synced state 1330 or the delete state 1345. It is possible that an object is deleted and saved, but this object may still have been referenced by other objects. These so-called "dangling references" are cleared by moving from hollow 1320 to deleted 13454 upon loading the parent MDO.

A created development object starts at entry point 1310 when, for example, there is no existing instance for that development object. In this case, the development object starts in a new state 1350. Until a file is created and synced (e.g., persisted), the development object remains in new state 1350, freely able to be changed through the API. If a developer deletes this development object, the development object enters a final cancelled state 1325. Because there is no associated file, cancelled state 1325 represents a state where the development object is erased and does not remain in the system. States 1325 and 1350 are referred to as transient states because nothing has been persisted. Once a developer persists a development object in new state 1350, the development object enters a synced state 1330. A subsequent delete causes the development object to enter a final deleted state 1345, where the file is marked deleted.

During the development process, application developer 160 uses tools 125 to create and modify development objects. Derived API 130 exposes several features to tools 125 used by application developer 160. One feature is the creation and modification of an ordered aggregation. Using the example development object of a controller with the instance name "MyController" above, there are three instances of the class Action 705 pursuant to an ordered aggregation relationship named "action3", "action2", and "action1". The actions were created in order (i.e., action 1, action 2, and action 3) and then moved around. For example, tools 125 can use the following example interface code:

```
// Ordered aggregations (positions are zero-based)
compController.createAction("action1");
compController.createAction("action2");
compController.createAction("action3",    // => { action1, action3,
1);                                         action2 }
compController.moveAction(0, 2);           // => { action3, action2, action1 }
```

The create method "compController.createAction("action3", 1)" includes an additional position parameter that defines that the created instance "action 3" is placed in position "1", which is the second position because the first position is "0" (i.e., zero-based position). That is why, as indicated in the comment field, the instance "action3" is placed in the middle of instances "action 1" and "action2". The move method subsequently moves the instance in position 0, which is the instance action1, to position 2.

Another feature is a copy and paste of development objects. For example, the example development object of a component above with the instance name "Comp1" includes two controller instances "Comp1Ctlr" and "MyController". Tools 125 can simply take one defined controller instance and copy that instance using the following example code:

```
// Copy&Paste: copy component controller "Comp1Ctlr" and paste it as
"CopyOfComp1Ctlr"
    MetamodelClipboard clipboard = Metamodel.getClipboard( );
    clipboard.copy(Comp1Ctlr);
    PasteProcess process = clipboard.initiatePaste(component);
    ClipboardObject[ ] cbobjects = process.getObjectsToRefactor( );
    cbobjects[0].setNewName("CopyOfComp1Ctlr");        // resolve
naming conflict
    DevelopmentObject[ ] copiedObjects = process.execute( );   // returns
newly created objects
    Controller copiedController = (Controller)copiedObjects[0];
```

This copy and paste operation allows the application developer to paste the copied development object below any compatible parent object. The process returns any naming issues and the conflicting development objects in which they occur.

Another feature is the refactoring of arbitrary development objects. Since the name of a development object is part of its key and therefore part of any reference to this object, renaming an object invalidates all existing references. Refactoring enables a developer to modify key attributes like name, aggregating parent, or package (for MDOs) while updating existing references within a given scope, thus ensuring referential integrity inside that scope. For example, tools 125 can use the following code:

```
// Refactoring: rename previously copied controller "CopyOfComp1Ctlr"
to "MyController"
    RefactoringRequest request = metamodel.createRefactoringRequest( );
    RefactoringTask task = request.createRefactoringTask(copiedController);
    task.setNewName("MyController");
    request.maximizeRefactoringScope( ); // search for references to update
in whole Metamodel instance
    request.execute( );
```

Here the copied controller (i.e., CopyOfComp1Ctlr) is renamed to MyController. The scope of refactoring is defined by tools 125 and can be set to different values. The maximizeRefactoringScope command searches for an applicable reference in all of the files in the application developer's local cache.

Another feature exposed by the API is transaction handling. This feature uses a singleton object to track all transactions, which allows global commits and rollbacks. With regard to this feature, the global transactions refer to any changes made to the development objects stored on the local cache 135. For example, with this transaction tracking, changes on local cache 135 can be undone before storing the modified development objects to repository 115. Another feature is a comprehensive eventing framework, allowing tools 125 to subscribe to certain predefined metamodel events, such as PROPERTY_CHANGED, OBJECT_DELETED, and the like, in order to, for example, update their display as soon as metadata changes occur. Another feature is the bookmarking of development objects by obtaining keys for the development objects. In another session, after a development object is bookmarked, a tool can use a reference key to obtain the lowest granularity development object. In other words, the file borders define the granularity of development objects (e.g., using MDO stereotype), but this feature allows a tool to find directly development objects within a MDO. Another feature is the validation of aggregations of development objects and aggregated children against the constraints imposed by the UML representation, for example cardinalities. Another feature is a SourcePathIdentifier interface that enables an application developer to define his own file system.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/ or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. The following are examples for illustration only and not to limit the alternatives in any way. The steps of the invention can be performed in a different order and still achieve desirable results.

What is claimed is:

1. A computer-readable storage device storing a computer program product operable to cause a data processing apparatus to:
   receive a metamodel in a first language, the first language comprising a customizable extension and the metamodel describing a diagram of classes that define one or more development objects, the development objects representing building blocks for developing an application;
   convert the metamodel to a model description that describes the metamodel in a second language according to an interchange format;
   generate a set of intermediate objects to represent the classes of the metamodel by parsing the model description, the generating including generating an Extensible Markup Language (XML) schema that enables implementation of the development objects by implementing at least one feature using the customizable extension, the at least one feature comprising at least one of an indication of a file border, a copy operation, or a paste operation; and
   generate code using the set of intermediate objects as inputs to derive a metadata Application Program Interface (API), the metadata API enabling development tools to access the development objects to develop the application.

2. The computer-readable storage device of claim 1, wherein the second language comprises Extensible Markup Language (XML).

3. The computer-readable storage device of claim 1, wherein the first language comprises unified modeling language (UML).

4. The computer-readable storage device of claim 1, wherein the metamodel is stored on one of a storage module, a server, and a portable storage device.

5. The computer-readable storage device of claim 1, wherein the set of intermediate objects comprises Java objects.

6. A non-transitory computer-readable storage device storing a computer program product, the computer program product being operable to cause a data processing apparatus to:
   receive a metamodel in a first language, the metamodel describing a diagram of classes that define one or more development objects, the development objects representing building blocks for developing the application, wherein the first language comprises a customizable extension and a unified modeling language;
   convert the metamodel to a model description that describes the metamodel in a second language according to an interchange format, wherein the second language comprises Extensible Markup Language (XML);
   generate a set of intermediate objects to represent the classes of the metamodel by parsing the model description, the generating including generating an XML schema that enables implementation of the development objects by implementing at least one feature using the customizable extension, the at least one feature comprising at least one of an indication of a file border, a copy operation, or a paste operation; and
   generate code using the set of intermediate objects as inputs to derive a metadata Application Program Interface (API), and further wherein the metadata API enables development tools to access the development objects to develop the application.

7. The computer-readable storage device of claim 6, wherein the set of intermediate objects comprises Java objects.

8. The computer-readable storage device of claim 6, wherein the XML schema includes a tree based on aggregation relationships in the metamodel.

9. The computer-readable storage device of claim 6, wherein the XML schema includes a reference based on an association relationship in the metamodel first model.

10. The computer-readable storage device of claim 6, wherein the XML schema includes a complex type extension based on an inheritance relationship in the metamodel.

11. A non-transitory computer-readable storage device storing a computer program product being operable to cause a data processing apparatus to:
receive a metamodel describing a diagram of classes that define one or more development objects, the received metamodel being in a language comprising a customizable extension and the development objects representing building blocks for developing the application;
generate an Extensible Markup Language Metadata Interchange (XMI) model that is a representation of the metamodel according to an interchange format;
generate a set of intermediate objects to represent the classes of the metamodel by parsing the XMI model using an XML parser, the generating including generating an XML schema that enables implementation of the development objects by implementing at least one feature using the customizable extension, the at least one feature comprising at least one of an indication of a file border, a copy operation, or a paste operation; and
generate code using the set of intermediate objects as inputs to derive a metadata API enabling development tools to access the development objects to develop the application.

12. The computer-readable storage device of claim 11, wherein the computer program product is further operable to cause the data processing apparatus to:
create a new development object as a transient object without an existing corresponding file; and
modify the transient object until the transient object is committed to a persistent file.

13. The computer-readable storage device of claim 12, wherein the computer program product is further operable to cause the data processing apparatus to destroy the transient object if a delete command is requested before the transient object is committed to a persistent file.

14. The computer-readable storage device of claim 12, wherein the computer program product is further operable to cause the data processing apparatus to mark the persistent file as deleted if a delete command is requested after the transient object is committed to a persistent file.

15. The computer-readable storage device of claim 11, wherein the metamodel is stored on one of a storage module, a server, and a portable storage device.

16. The computer-readable storage device of claim 11, wherein the set of intermediate objects comprises Java objects.

* * * * *